(12) United States Patent
Hur et al.

(10) Patent No.: US 12,250,414 B2
(45) Date of Patent: Mar. 11, 2025

(54) POINT CLOUD DATA PROCESSING DEVICE AND PROCESSING METHOD

(71) Applicant: LG ELECTRONICS INC., Seoul (KR)

(72) Inventors: Hyejung Hur, Seoul (KR); Sejin Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 137 days.

(21) Appl. No.: 18/008,310

(22) PCT Filed: Jun. 7, 2021

(86) PCT No.: PCT/KR2021/007076
§ 371 (c)(1),
(2) Date: Dec. 5, 2022

(87) PCT Pub. No.: WO2021/246837
PCT Pub. Date: Dec. 9, 2021

(65) Prior Publication Data
US 2023/0209099 A1 Jun. 29, 2023

(30) Foreign Application Priority Data
Jun. 5, 2020 (KR) .................. 10-2020-0068399

(51) Int. Cl.
*H04N 19/96* (2014.01)
*H04N 19/174* (2014.01)
*H04N 19/597* (2014.01)
*H04N 19/70* (2014.01)

(52) U.S. Cl.
CPC ........... *H04N 19/96* (2014.11); *H04N 19/174* (2014.11); *H04N 19/597* (2014.11); *H04N 19/70* (2014.11)

(58) Field of Classification Search
CPC .... H04N 19/96; H04N 19/174; H04N 19/597; H04N 19/70; H04N 19/50; G06T 9/40
See application file for complete search history.

(56) References Cited

U.S. PATENT DOCUMENTS

| 11,902,348 | B2 * | 2/2024 | Hur | ................... H04L 67/06 |
| 2021/0104075 | A1 * | 4/2021 | Mammou | ................ G06T 9/40 |
| 2021/0400103 | A1 * | 12/2021 | Hur | ................... H04L 65/75 |

(Continued)

FOREIGN PATENT DOCUMENTS

| KR | 1020180109927 A | 10/2018 |
| KR | 1020190044629 A | 4/2019 |
| WO | 2021246839 A1 | 12/2021 |

OTHER PUBLICATIONS

D. Flynn et al., "G-PCC: Combined octree-predictive geometry coding", International Organisation for Standardisation Organisation International De Normalisation ISO/IEC JTC1/SC29/WG11 Coding of Moving Pictures and Audio, MPEG/m52519, Jan. 2020.

(Continued)

*Primary Examiner* — Farzana Hossain
(74) *Attorney, Agent, or Firm* — Bryan Cave Leighton Paisner LLP

(57) ABSTRACT

A point cloud data processing method according to embodiments can encode and transmit point cloud data. A point cloud data processing method according to embodiments can receive and decode point cloud data.

12 Claims, 25 Drawing Sheets

(56) References Cited

U.S. PATENT DOCUMENTS

| | | | |
|---|---|---|---|
| 2022/0262043 A1* | 8/2022 | Nakagami | G06T 9/001 |
| 2022/0353531 A1* | 11/2022 | Hur | H04N 19/96 |
| 2023/0154052 A1* | 5/2023 | Oh | G06T 9/40 |
| | | | 375/240.01 |
| 2023/0206510 A1* | 6/2023 | Hur | G06T 9/001 |
| | | | 382/232 |
| 2023/0232042 A1* | 7/2023 | Hur | H04N 19/164 |
| | | | 375/240.08 |
| 2023/0239501 A1* | 7/2023 | Oh | H04N 19/136 |
| | | | 375/240.08 |
| 2023/0360273 A1* | 11/2023 | Oh | H04N 19/96 |
| 2023/0388557 A1* | 11/2023 | Oh | H04N 21/4402 |
| 2023/0394712 A1* | 12/2023 | Park | G06T 9/001 |
| 2024/0163426 A1* | 5/2024 | Oh | H04N 19/172 |

OTHER PUBLICATIONS

Z. Gao et al., "[G-PCC][New proposal] Predictive Geometry Coding", International Organisation for Standardisation Organisation International De Normalisation ISO/IEC JTC1/SC29/WG11 Coding of Moving Pictures and Audio, MPEG2019/m51012, Oct. 2019.

K. Mammou et al., "G-PCC codec description v2", International Organisation for Standardisation Organisation International De Normalisation ISO/IEC JTC1/SC29/WG11 Coding of Moving Pictures and Audio, N18189, Jan. 2019.

\* cited by examiner

FIG. 6
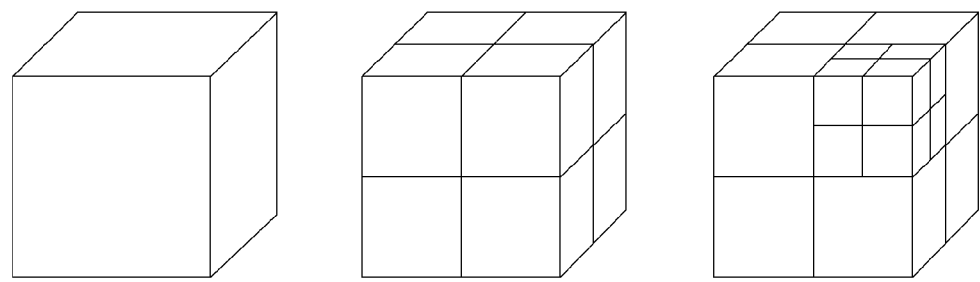
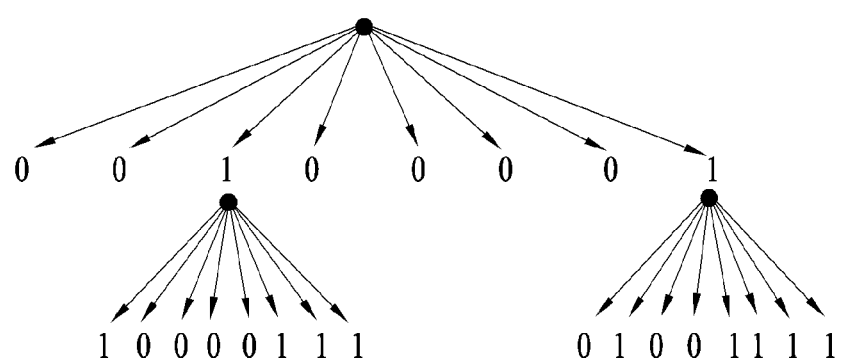

FIG. 7
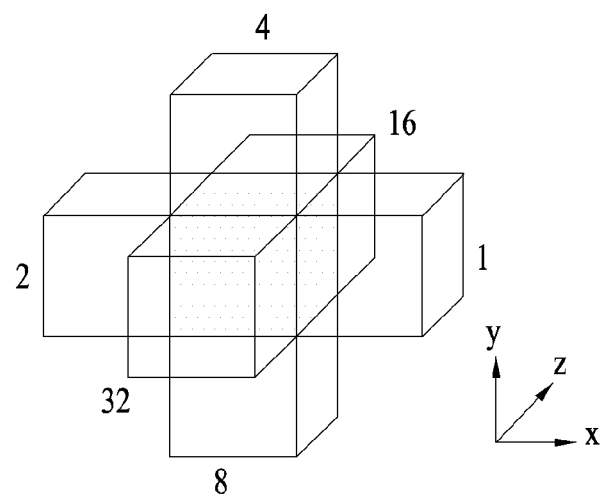
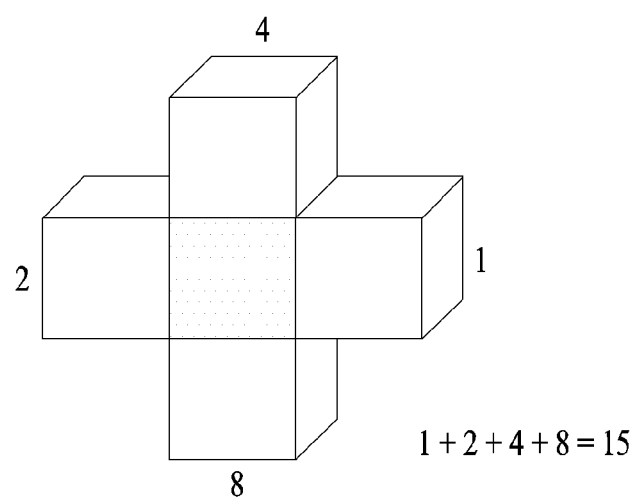
$1 + 2 + 4 + 8 = 15$

FIG. 18

| seq_parameter_set_rbsp( ) { | Descriptor |
|---|---|
|   profile_idc | u(8) |
|   profile_compatibility_flags | u(24) |
|   ... | |
|   sps_num_attribute_sets | ue(v) |
|   for( i = 0; i< sps_num_attribute_sets; i++ ) { | |
|     attribute_dimension[ i ] | ue(v) |
|     attribute_instance_id[ i ] | ue(v) |
|   ... | |
|   } | |
|   pred_geom_tree_sorting_type | u(4) |
|   if (pred_geom_type_sorting_type > 0) { | |
|     pred_geom_tree_sorting_ascending_flag | u(1) |
|   } | |
|   pred_geom_tree_building_method | u(4) |
|   if (pred_geom_tree_building_method == 1 \|\| pred_geom_tree_building_method== 2) { | |
|     neighbour_attr_different_method | ue(v) |
|   } else if (pred_geom_tree_building_method == 3) { | |
|     pred_geom_tree_N_idx | ue(v) |
|   } | |
|   ... | |
|   byte_alignment( ) | |
| } | |

FIG. 19

| geometry_parameter_set_rbsp( ) { | Descriptor |
|---|---|
|   gps_geom_parameter_set_id | ue(v) |
|   gps_seq_parameter_set_id | ue(v) |
|   ... | |
|   pred_geom_tree_sorting_type | u(4) |
|   if (pred_geom_type_sorting_type > 0) { | |
|     pred_geom_tree_sorting_ascending_flag | u(1) |
|   } | |
|   pred_geom_tree_building_method | u(4) |
|   if (pred_geom_tree_building_method == 1 \|\| pred_geom_tree_building_method== 2 ) { | |
|     neighbour_attr_different_method | ue(v) |
|     } else if (pred_geom_tree_building_method == 3) { | |
|     pred_geom_tree_N_idx | ue(v) |
|     } | |
| | |
|   ... | |
|   byte_alignment( ) | |
| } | |

FIG. 20

| tile_parameter_set( ) { | Descriptor |
|---|---|
| num_tiles | ue(v) |
| for( i = 0; i < num_tiles; i++ ) { | |
| tile_bounding_box_offset_x[ i ] | se(v) |
| tile_bounding_box_offset_y[ i ] | se(v) |
| ... | |
| pred_geom_tree_sorting_type[i] | u(4) |
| if (pred_geom_type_sorting_type[i] > 0) { | |
| pred_geom_tree_sorting_ascending_flag[i] | u(1) |
| } | |
| pred_geom_tree_building_method[i] | u(4) |
| if (pred_geom_tree_building_method[i] == 1 \|\| pred_geom_tree_building_method[i] == 2) { | |
| neighbour_attr_different_method[i] | ue(v) |
| } else if (pred_geom_tree_building_method[i] == 3) { | |
| pred_geom_tree_N_idx[i] | ue(v) |
| } | |
| ... | |
| } | |
| byte_alignment( ) | |
| } | |

FIG. 21

| geometry_slice_header( ) { | Descriptor |
|---|---|
|   gsh_geometry_parameter_set_id | ue(v) |
|   gsh_tile_id | ue(v) |
|   gsh_slice_id | ue(v) |
|   ... | |
|   pred_geom_tree_sorting_type | u(4) |
|   if (pred_geom_type_sorting_type > 0) { | |
|     pred_geom_tree_sorting_ascending_flag | u(1) |
|   } | |
|   pred_geom_tree_building_method | u(4) |
|   if (pred_geom_tree_building_method == 1 \|\| pred_geom_tree_building_method == 2) { | |
|     neighbour_attr_different_method | ue(v) |
|   } else if (pred_geom_tree_building_method == 3) { | |
|     pred_geom_tree_N_idx | ue(v) |
|   } | |
|   ... | |
|   } | |
|   byte_alignment( ) | |
| } | |

POINT CLOUD DATA PROCESSING DEVICE AND PROCESSING METHOD

CROSS-REFERENCE TO RELATED APPLICATIONS

This application is a National Stage Application of International Application No. PCT/KR2021/007076, filed on Jun. 7, 2021, which claims the benefit of and priority to Korean Patent Application No. 10-2020-0068399, filed on Jun. 5, 2020, which are hereby incorporated by reference in their entirety for all purposes as if fully set forth herein.

TECHNICAL FIELD

Embodiments provide a method for providing point cloud contents to provide a user with various services such as virtual reality (VR), augmented reality (AR), mixed reality (MR), and self-driving services.

BACKGROUND

Point cloud content is content represented by a point cloud, which is a set of points belonging to a coordinate system representing a three-dimensional space. The point cloud content may express media configured in three dimensions, and is used to provide various services such as virtual reality (VR), augmented reality (AR), mixed reality (MR), and self-driving services. However, tens of thousands to hundreds of thousands of point data are required to represent point cloud content. Therefore, there is a need for a method for efficiently processing a large amount of point data.

SUMMARY

Embodiments provide a device and method for efficiently processing point cloud data. Embodiments provide a point cloud data processing method and device for addressing latency and encoding/decoding complexity.

The technical scope of the embodiments is not limited to the aforementioned technical objects, and may be extended to other technical objects that may be inferred by those skilled in the art based on the entire contents disclosed herein.

Therefore, in order to efficiently process point cloud data, provided herein is a method of processing point cloud data performed by a device including one or more processors and one or more memories coupled with the one or more processors. The method may include encoding a geometry of the point cloud data, and encoding an attribute of the point cloud data based on the encoded geometry. According to embodiments, the geometry may indicate positions of points of the point cloud data, and the attribute may indicate at least one of color and reflectance of the points.

In another aspect of the present disclosure, provided herein is a device for processing point cloud data. The device may include one or more processors configured to process point cloud data, and one or more memories coupled with the one or more processors. According to embodiments, the one or more processors may be configured to carry out a processing method including encoding a geometry of the point cloud data, and encoding an attribute of the point cloud data based on the encoded geometry. According to embodiments, the geometry may indicate positions of points of the point cloud data, and wherein the attribute may indicate at least one of color and reflectance of the points.

In another aspect of the present disclosure, provided herein is a method of processing point cloud data performed by a device including one or more processors and one or more memories coupled with the one or more processors. The method may include decoding a geometry of the point cloud data, and decoding an attribute of the point cloud data based on the decoded geometry. According to embodiments, the geometry may indicate positions of points of the point cloud data, and the attribute may indicate at least one of color and reflectance of the points.

In another aspect of the present disclosure, provided herein is a device for processing point cloud data. The device may include one or more processors configured to process point cloud data, and one or more memories coupled with the one or more processors. According to embodiments, the one or more processors may be configured to carry out a processing method including decoding a geometry of the point cloud data, and decoding an attribute of the point cloud data based on the decoded geometry. According to embodiments, the geometry may indicate positions of points of the point cloud data, and the attribute may indicate at least one of color and reflectance of the points.

Devices and methods according to embodiments may process point cloud data with high efficiency.

The devices and methods according to the embodiments may provide a high-quality point cloud service.

The devices and methods according to the embodiments may provide point cloud content for providing general-purpose services such as a VR service and a self-driving service.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. For a better understanding of various embodiments described below, reference should be made to the description of the following embodiments in connection with the accompanying drawings. The same reference numbers will be used throughout the drawings to refer to the same or like parts. In the drawings:

FIG. 6 shows an example of an octree and occupancy code according to embodiments;

FIG. 7 shows an example of a neighbor node pattern according to embodiments;

FIG. 18 shows an example of a syntax structure of signaling information related to a predictive tree;

FIG. 19 shows an example of a syntax structure of signaling information related to a predictive tree;

FIG. 20 shows an example of a syntax structure of signaling information related to a predictive tree;

FIG. 21 shows an example of a syntax structure of signaling information related to a predictive tree;

DETAILED DESCRIPTION

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that may be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
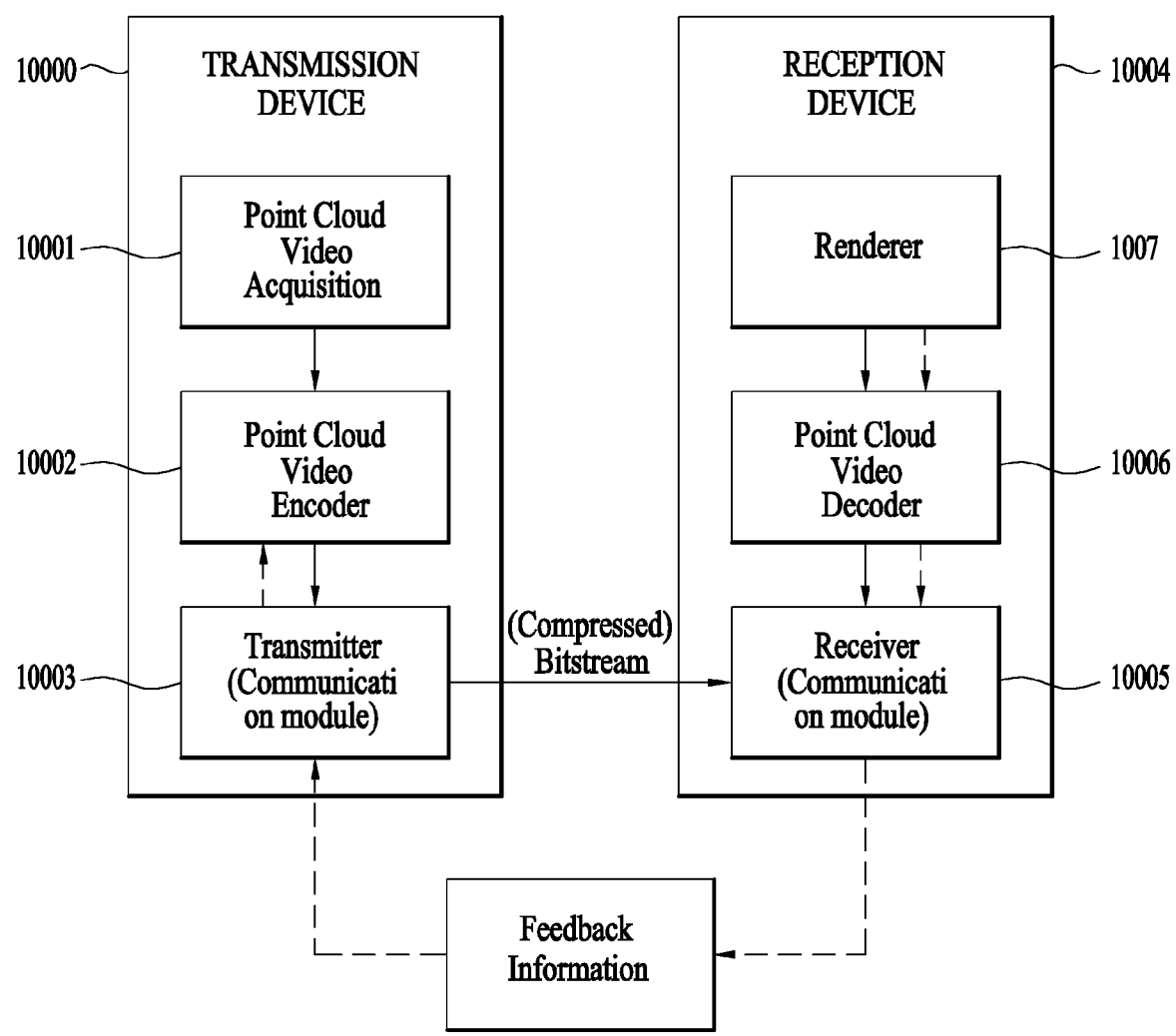
FIG. 1 shows an exemplary point cloud content providing system according to embodiments.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquirer 10001, a point cloud video encoder 10002, and/or a transmitter (or communication module) 10003.

The point cloud video acquirer 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (for example, a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (for example, a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component) separate from the receiver 10005.

The point cloud video decoder 10006 decodes the bitstream containing the point cloud video data. The point cloud video decoder 10006 may decode the point cloud video data according to the method by which the point cloud video data is encoded (for example, in a reverse process of the operation of the point cloud video encoder 10002). Accordingly, the point cloud video decoder 10006 may decode the point cloud video data by performing point cloud decompression coding, which is the inverse process of the point cloud compression. The point cloud decompression coding includes G-PCC coding.

The renderer 10007 renders the decoded point cloud video data. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to embodiments is information about the user's head position, orientation, angle, motion, and the like. The reception device 10004 according to the embodiments may calculate the viewport information based on the head orientation information. The viewport information may be information about a region of a point cloud video that the user is viewing. A viewpoint is a point through which the user is viewing the point cloud video, and may refer to a center point of the viewport region. That is, the viewport is a region centered on the viewpoint, and the size and shape of the region may be determined by a field of view (FOV). Accordingly, the reception device 10004 may extract the viewport information based on a vertical or horizontal FOV supported by the device in addition to the head orientation information. Also, the reception device 10004 performs gaze analysis or the like to check the way the user consumes a point cloud, a region that the user gazes at in the point cloud video, a gaze time, and the like. According to embodiments, the reception device 10004 may transmit feedback information including the result of the gaze analysis to the transmission device 10000. The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The point cloud content providing system may process (encode/decode) point cloud data based on the feedback information. Accordingly, the point cloud video data decoder 10006 may perform a decoding operation based on the feedback information. The reception device 10004 may transmit the feedback information to the transmission device 10000. The transmission device 10000 (or the point cloud video data encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmission device, a transmitter, or the like, and the reception device 10004 may be called a decoder, a receiving device, a receiver, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
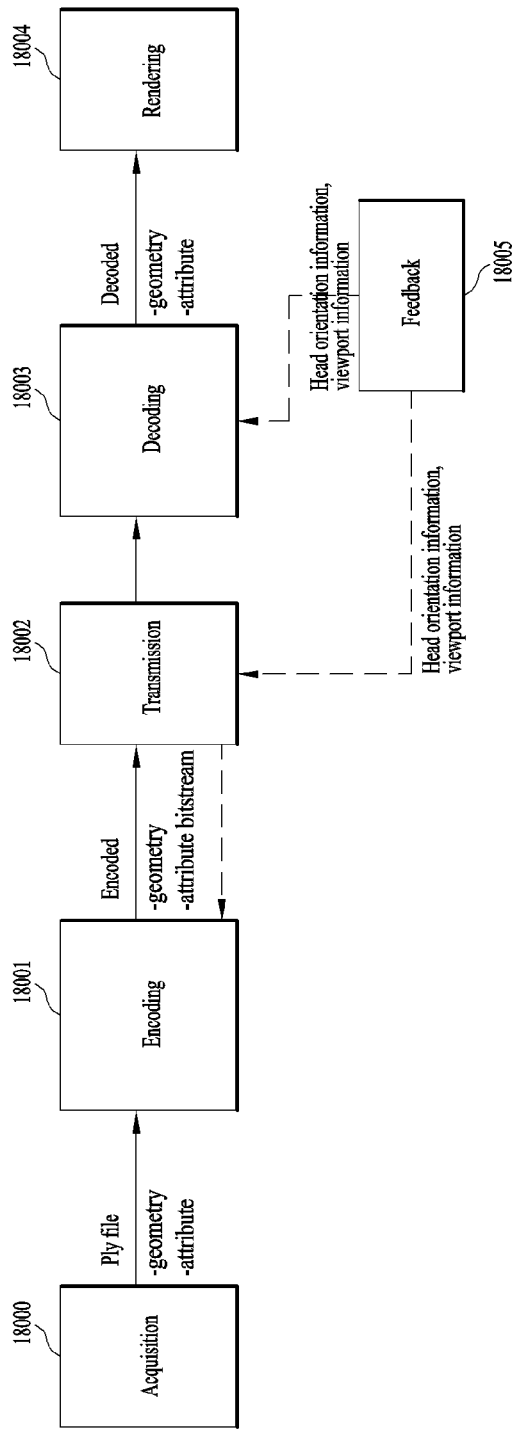
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (for example, the point cloud transmission device 10000 or the point cloud video acquirer 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (for example, values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like. The point cloud content providing system (for example, the point cloud transmission device 10000 or the point cloud video acquirer 10001) may secure point cloud data from information (e.g., depth information, color information, etc.) related to the acquisition process of the point cloud video.

The point cloud content providing system (for example, the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (for example, the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (for example, signaling information related to the geometry encoding and the attribute encoding). The point cloud content providing system may encapsulate a bitstream that carries the encoded point cloud data and transmit the same in the form of a file or segment.

The point cloud content providing system (for example, the reception device 10004 or the receiver 10005) according to the embodiments may receive the bitstream containing the encoded point cloud data. In addition, the point cloud content providing system (for example, the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (for example, the reception device 10004 or the point cloud video decoder 10005) may decode the point cloud video data based on the signaling information related to encoding of the point cloud video data contained in the bitstream. The point cloud content providing system (for example, the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (for example, the reception device 10004 or the point cloud video decoder 10005) may reconstruct the point cloud video based on the positions according to the reconstructed geometry and the decoded attributes.

The point cloud content providing system according to the embodiments (for example, the reception device 10004 or the renderer 10007) may render the decoded point cloud data (20004). The point cloud content providing system (for example, the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (e.g., the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

Figure 3:
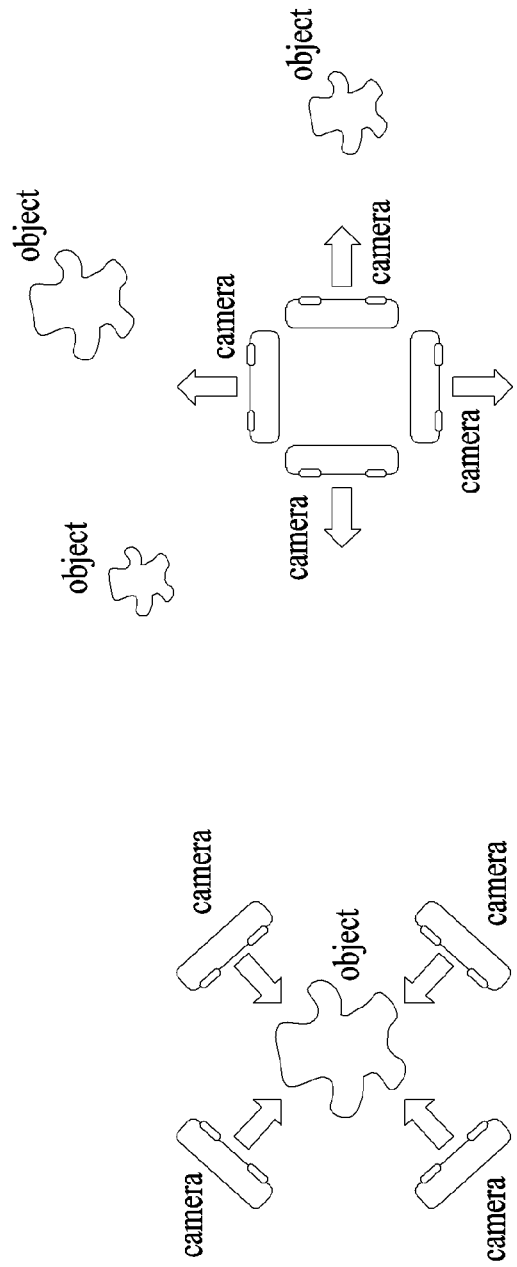
FIG. 3 illustrates an exemplary process of capturing a point cloud video according to embodiments.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in the figure, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (for example, a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
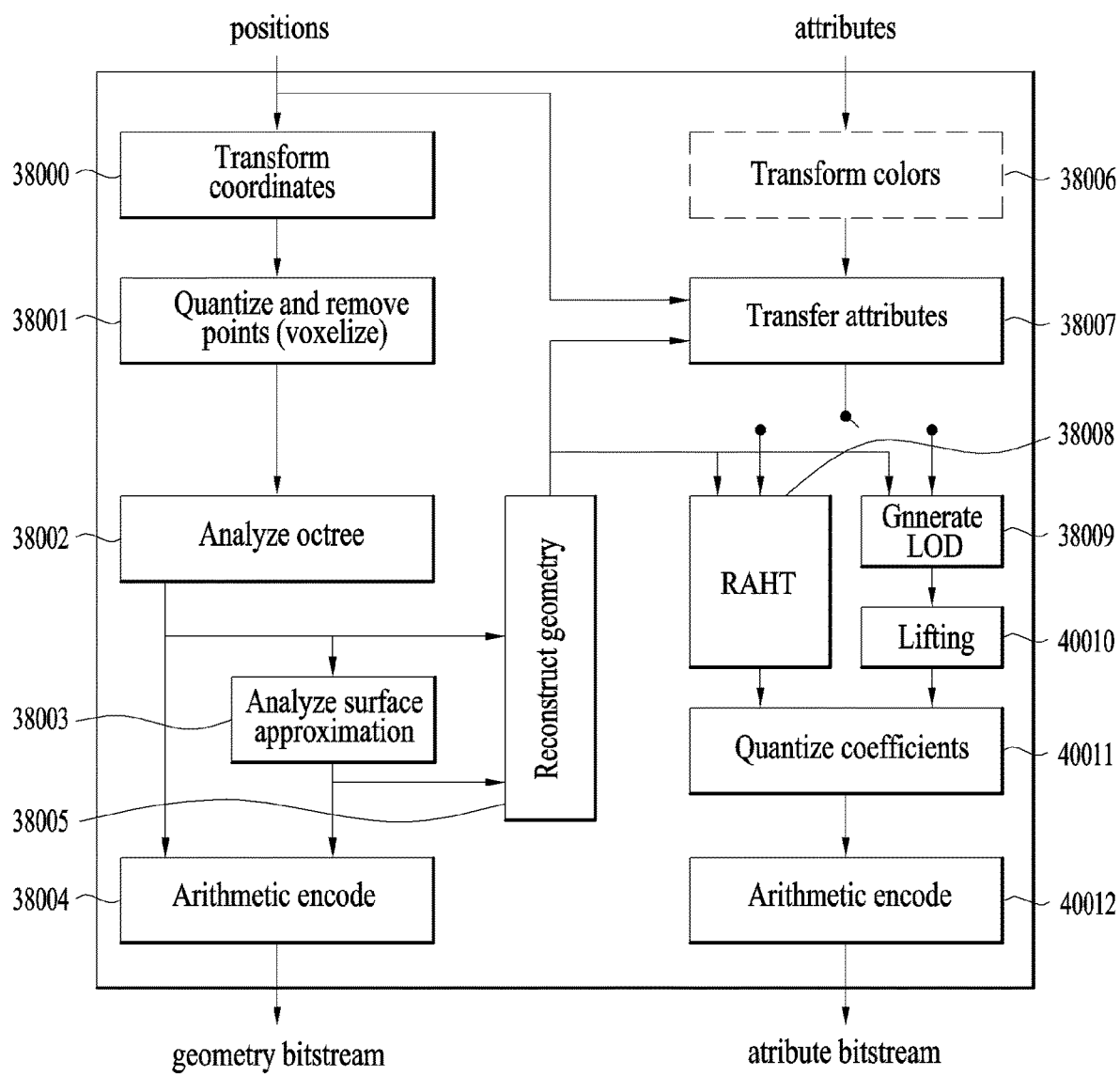
FIG. 4 illustrates an exemplary point cloud encoder according to embodiments.

FIG. 4 illustrates an exemplary point cloud encoder according to embodiments.

FIG. 4 shows an example of the point cloud video encoder 10002 of FIG. 1. The point cloud encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 and 2, the point cloud encoder may perform geometry encoding and attribute encoding. The geometry encoding is performed before the attribute encoding.

The point cloud encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometry reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (for example, a three-dimensional space represented by an XYZ coordinate system). The position information in the three-dimensional space according to the embodiments may be referred to as geometry information.

The quantizer 40001 according to the embodiments quantizes the geometry. For example, the quantizer 40001 may quantize the points based on a minimum position value of all points (for example, a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. As in the case of a pixel, which is the minimum unit containing 2D image/video information, points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (for example, from RGB to YCbCr). The operation of the color transformer 40006 according to embodiments may be optionally applied according to the color values included in the attributes.

The geometry reconstructor 40005 according to the embodiments reconstructs (decompresses) the octree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighboring points existing within a specific position/radius from the position of the center of each voxel based on the K-D tree or the Morton code. The K-D tree is a binary search tree and supports a data structure capable of managing points based on the positions such that nearest neighbor search (NNS) can be performed quickly. The Morton code is generated by presenting coordinates (e.g., (x, y, z)) representing 3D positions of all points as bit values and mixing the bits. For example, when the coordinates representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD) to perform prediction transform coding. The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud encoder of FIG. 4 may be implemented by hardware including one or more processors or integrated circuits configured to communicate with one or more memories included in the point cloud providing device, software, firmware, or a combination thereof. The one or more processors may perform at least one of the operations and/or functions of the elements of the point cloud encoder of FIG. 4 described above. Additionally, the one or more processors may operate or execute a set of software programs and/or instructions for performing the operations and/or functions of the elements of the point cloud encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
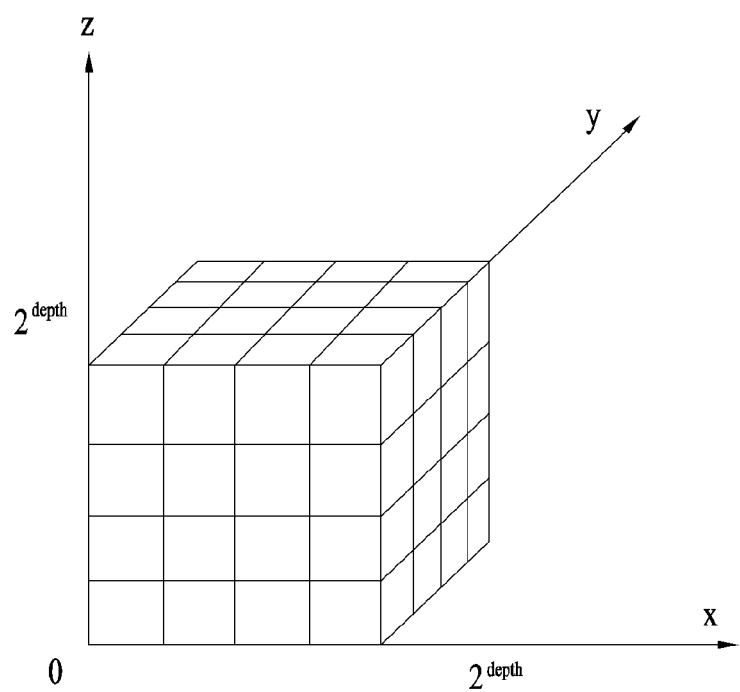
FIG. 5 shows an example of voxels according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and ($2^d$, $2^d$, $2^d$) is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted.

FIG. 6 shows an example of an octree and occupancy code according to embodiments.

As described with reference to FIGS. 1 to 4, the point cloud content providing system (point cloud video encoder 10002) or the point cloud encoder (for example, the octree analyzer 40002) performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and $(2^d, 2^d, 2^d)$. Here, 2d may be set to a value constituting the smallest bounding box surrounding all points of the point cloud content (or point cloud video). Here, d denotes the depth of the octree. The value of d is determined in the following equation. In the following equation, $(x^{int}_n, y^{int}_n, z^{int}_n)$ denotes the positions (or position values) of quantized points.

$$d = \text{Ceil}(\text{Log } 2(\text{Max}(x_n^{int}, y_n^{int}, z_n^{int}, n=1, \ldots, N)+1))$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud encoder (for example, the arithmetic encoder 40004) according to the embodiments may perform entropy encoding on the occupancy codes. In order to increase the compression efficiency, the point cloud encoder may perform intra/inter-coding on the occupancy codes. The reception device (for example, the reception device 10004 or the point cloud video decoder 10006) according to the embodiments reconstructs the octree based on the occupancy codes.

The point cloud encoder (for example, the point cloud encoder of FIG. 4 or the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud encoder according to the embodiments may skip voxelization and perform direct coding to directly code the positions of points included in the specific region. The coordinates of a direct coding point according to the embodiments are referred to as direct coding mode (DCM). The point cloud encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud encoder (or the arithmetic encoder 40004) according to the embodiments may perform entropy coding on the positions (or position values) of the points.

The point cloud encoder (for example, the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud encoder according to the embodiments may specify a level at which trisoup geometry encoding is to be applied. For example, when the specific level is equal to the depth of the octree, the point cloud encoder does not operate in the trisoup mode. In other words, the point cloud encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud encoder according to the embodiments may perform entropy encoding on the starting point (x, y, z) of the edge, the direction vector ($\Delta$x, $\Delta$y, $\Delta$z) of the edge, and the vertex position value (relative position value within the edge). When the trisoup geometry encoding is applied, the point cloud encoder according to the embodiments (for example, the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed by: i) calculating the centroid value of each vertex, ii) subtracting the center value from each vertex value, and iii) estimating the sum of the squares of the values obtained by the subtraction.

$$\begin{bmatrix} \mu_x \\ \mu_y \\ \mu_z \end{bmatrix} = \frac{1}{n}\sum_{i=1}^{n} \begin{bmatrix} x_i \\ y_i \\ z_i \end{bmatrix}; \quad \text{i)}$$

$$\begin{bmatrix} \overline{x}_i \\ \overline{y}_i \\ \overline{z}_i \end{bmatrix} = \begin{bmatrix} x_i \\ y_i \\ z_i \end{bmatrix} - \begin{bmatrix} \mu_x \\ \mu_y \\ \mu_z \end{bmatrix}; \quad \text{ii)}$$

$$\begin{bmatrix} \sigma_x^2 \\ \sigma_y^2 \\ \sigma_z^2 \end{bmatrix} = \sum_{i=1}^{n} \begin{bmatrix} \overline{x}_i^2 \\ \overline{y}_i^2 \\ \overline{z}_i^2 \end{bmatrix} \quad \text{iii)}$$

The minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of θ is estimated through atan2(bi, ai), and the vertices are ordered based on the value of θ. The table below shows a combination of vertices for creating a triangle according to the number of the vertices. The vertices are ordered from 1 to n. The table below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

TABLE 2-1

Triangles formed from vertices ordered 1, . . . , n

| n | triangles |
|---|---|
| 3 | (1, 2, 3) |
| 4 | (1, 2, 3), (3, 4, 1) |
| 5 | (1, 2, 3), (3, 4, 5), (5, 1, 3) |
| 6 | (1, 2, 3), (3, 4, 5), (5, 6, 1), (1, 3, 5) |
| 7 | (1, 2, 3), (3, 4, 5), (5, 6, 7), (7, 1, 3), (3, 5, 7) |
| 8 | (1, 2, 3), (3, 4, 5), (5, 6, 7), (7, 8, 1), (1, 3, 5), (5, 7, 1) |
| 9 | (1, 2, 3), (3, 4, 5), (5, 6, 7), (7, 8, 9), (9, 1, 3), (3, 5, 7), (7, 9, 3) |
| 10 | (1, 2, 3), (3, 4, 5), (5, 6, 7), (7, 8, 9), (9, 10, 1), (1, 3, 5), (5, 7, 9), (9, 1, 5) |
| 11 | (1, 2, 3), (3, 4, 5), (5, 6, 7), (7, 8, 9), (9, 10, 11), (11, 1, 3), (3, 5, 7), (7, 9, 11), (11, 3, 7) |
| 12 | (1, 2, 3), (3, 4, 5), (5, 6, 7), (7, 8, 9), (9, 10, 11), (11, 12, 1), (1, 3, 5), (5, 7, 9), (9, 11, 1), (1, 5, 9) |

The upsampling process is performed to add points in the middle along the edge of the triangle and perform voxelization. The added points are generated based on the upsampling factor and the width of the block. The added points are called refined vertices. The point cloud encoder according to the embodiments may voxelize the refined vertices. In addition, the point cloud encoder may perform attribute encoding based on the voxelized positions (or position values).

FIG. 7 shows an example of a neighbor node pattern according to embodiments.

In order to increase the compression efficiency of the point cloud video, the point cloud encoder according to the embodiments may perform entropy coding based on context adaptive arithmetic coding.

As described with reference to FIGS. 1 to 6, the point cloud content providing system or the point cloud encoder (for example, the point cloud video encoder 10002, the point cloud encoder or arithmetic encoder 40004 of FIG. 4) may perform entropy coding on the occupancy code immediately. In addition, the point cloud content providing system or the point cloud encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using 23=8 methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud encoder according to the embodiments determines occupancy of neighbor nodes of each node of the octree and obtains a value of a neighbor pattern. The neighbor node pattern is used to infer the occupancy pattern of the node. The left part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The right part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud encoder may perform coding according to the neighbor node pattern value (for example, when the neighbor node pattern value is 63, 64 kinds of coding may be performed). According to embodiments, the point cloud encoder may reduce coding complexity by changing a neighbor node pattern value (for example, based on a table by which 64 is changed to 10 or 6).

Figure 8:
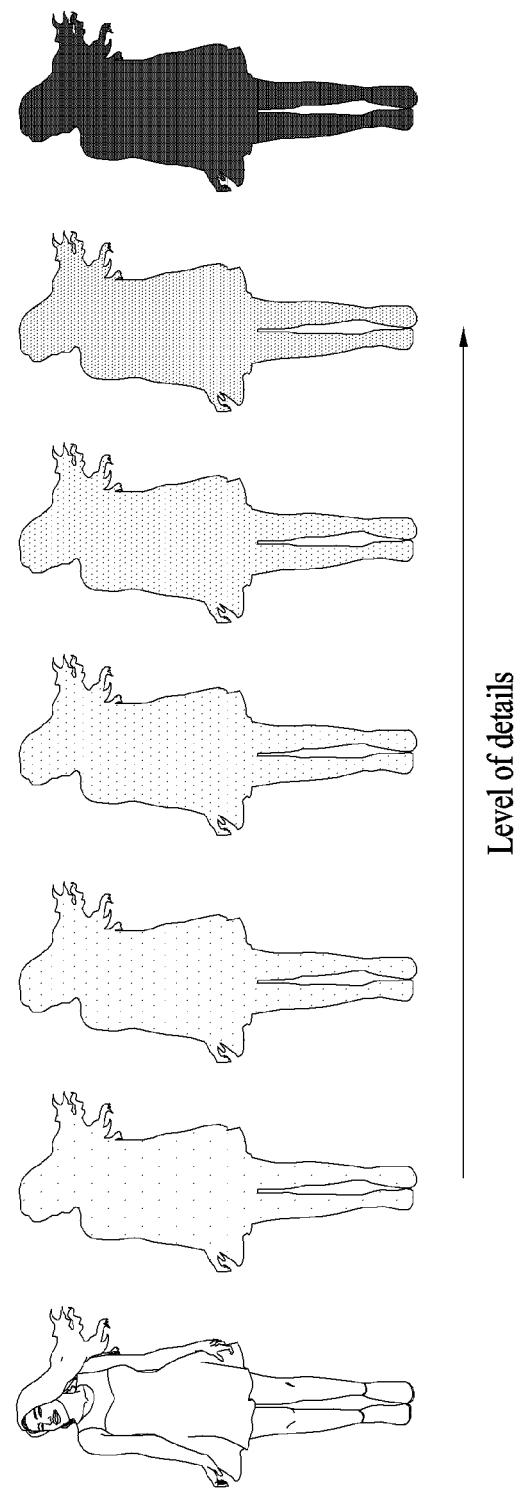
FIG. 8 illustrates an example of point configuration in each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, up-sampling, and voxelization. Since the attribute depends on the geometry, attribute encoding is performed based on the reconstructed geometry.

The point cloud encoder (for example, the LOD generator 40009) may classify (reorganize) points by LOD. The figure shows the point cloud content corresponding to LODs. The leftmost picture in the figure represents original point cloud content. The second picture from the left of the figure represents distribution of the points in the lowest LOD, and the rightmost picture in the figure represents distribution of the points in the highest LOD. That is, the points in the lowest LOD are sparsely distributed, and the points in the highest LOD are densely distributed. That is, as the LOD rises in the direction pointed by the arrow indicated at the bottom of the figure, the space (or distance) between points is narrowed.

Figure 9:
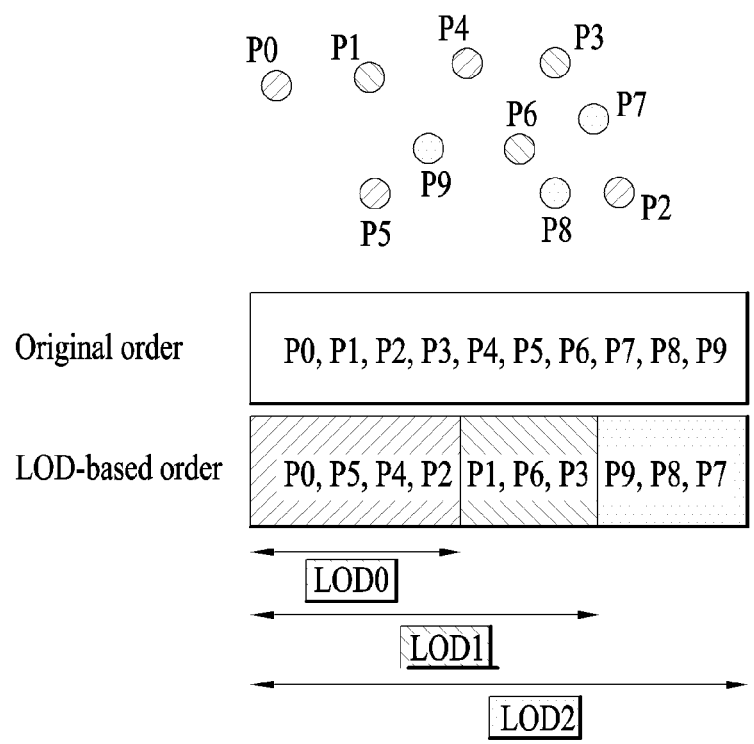
FIG. 9 illustrates an example of point configuration in each LOD according to embodiments.

FIG. 9 illustrates an example of point configuration for each LOD according to embodiments.

As described with reference to FIGS. 1 to 8, the point cloud content providing system, or the point cloud encoder (for example, the point cloud video encoder 10002, the point cloud encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud encoder, but also by the point cloud decoder.

The upper part of FIG. 9 shows examples (P0 to P9) of points of the point cloud content distributed in a 3D space.

In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud encoder according to the embodiments may perform prediction transform coding, lifting transform coding, and RAHT transform coding selectively or in combination.

The point cloud encoder according to the embodiments may generate a predictor for points to perform prediction transform coding for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud encoder according to the embodiments (for example, the coefficient quantizer 40011) may quantize and inversely quantize the residuals (which may be called residual attributes, residual attribute values, or attribute prediction residuals) obtained by subtracting a predicted attribute (attribute value) from the attribute (attribute value) of each point. The quantization process is configured as shown in the following table.

```
TABLE Attribute prediction residuals quantization
pseudo code
int PCCQuantization(int value, int quantStep) {
if( value >=0) {
return floor(value/quantStep + 1.0/3.0);
} else {
return -floor(-value/quantStep + 1.0/3.0);
}
}
TABLE Attribute prediction residuals inverse
quantization pseudo code
int PCCInverseQuantization(int value, int quantStep) {
if( quantStep == 0) {
return value;
} else {
return value * quantStep;
}
}
```

When the predictor of each point has neighbor points, the point cloud encoder (e.g., the arithmetic encoder 40012) according to the embodiments may perform entropy coding on the quantized and inversely quantized residual values as described above. When the predictor of each point has no neighbor point, the point cloud encoder according to the embodiments (for example, the arithmetic encoder 40012) may perform entropy coding on the attributes of the corresponding point without performing the above-described operation.

The point cloud encoder according to the embodiments (for example, the lifting transformer 40010) may generate a predictor of each point, set the calculated LOD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.
2) Lift prediction process: Subtract the value obtained by multiplying the attribute value of the point by the weight from the existing attribute value to calculate a predicted attribute value.
3) Create temporary arrays called updateweight and update and initialize the temporary arrays to zero.
4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.
5) Lift update process: Divide the attribute values of the update array for all predictors by the weight value of the updateweight array of the predictor index, and add the existing attribute value to the values obtained by the division.
6) Calculate predicted attributes by multiplying the attribute values updated through the lift update process by the weight updated through the lift prediction process (stored in the QW) for all predictors. The point cloud encoder (e.g., coefficient quantizer 40011) according to the embodiments quantizes the predicted attribute values. In addition, the point cloud encoder (e.g., the arithmetic encoder 40012) performs entropy coding on the quantized attribute values.

The point cloud encoder (for example, the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

The equation below represents a RAHT transformation matrix. In the equation, $g_{l_{x,y,z}}$ denotes the average attribute value of voxels at level l. $g_{l_{x,y,z}}$ may be calculated based on $g_{l+1_{2x,y,z}}$ and $g_{l+1_{2x+1,y,z}}$. The weights for $g_{l_{2x,y,z}}$ and $g_{l_{2x+1,y,z}}$ are $w1=w_{l_{2x,y,z}}$ and $w2=w_{l_{2x+1,y,z}}$.

$$\begin{bmatrix} g_{l-1_{x,y,z}} \\ h_{l-1_{x,y,z}} \end{bmatrix} = T_{w1w2} \begin{bmatrix} g_{l_{2x,y,z}} \\ g_{l_{2x+1,y,z}} \end{bmatrix}, T_{w1w2} = \frac{1}{\sqrt{w1+w2}} \begin{bmatrix} \sqrt{w1} & \sqrt{w2} \\ -\sqrt{w2} & \sqrt{w1} \end{bmatrix}$$

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (for example, encoding by the arithmetic encoder 400012). The weights are calculated as $w_{l-1_{x,y,z}} = w_{l_{2x,y,z}} + w_{l_{2x+1,y,z}}$. The root node is created through the $g_{l_{0,0,0}}$ and $g_{l_{0,0,1}}$ as follows.

$$\begin{bmatrix} gDC \\ h_{0_{0,0,0}} \end{bmatrix} = T_{w1000w1001} \begin{bmatrix} g_{l_{0,0,0z}} \\ g_{l_{0,0,1}} \end{bmatrix}$$

Figure 10:
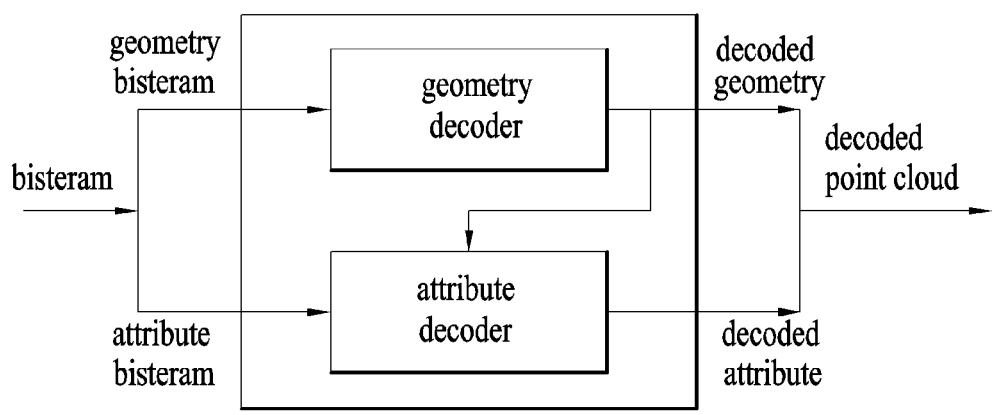
FIG. 10 illustrates a point cloud decoder according to embodiments.

FIG. 10 illustrates a point cloud decoder according to embodiments.

The point cloud decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud decoder may receive a geometry bitstream and an attribute bitstream contained in one or more bitstreams. The point cloud decoder includes a geometry decoder and an attribute decoder. The geometry decoder performs geometry decoding on the geometry bitstream and outputs decoded geometry. The attribute decoder performs attribute decoding based on the decoded geometry and the attribute bitstream, and outputs decoded attributes. The decoded geometry and decoded attributes are used to reconstruct point cloud content (a decoded point cloud).

Figure 11:
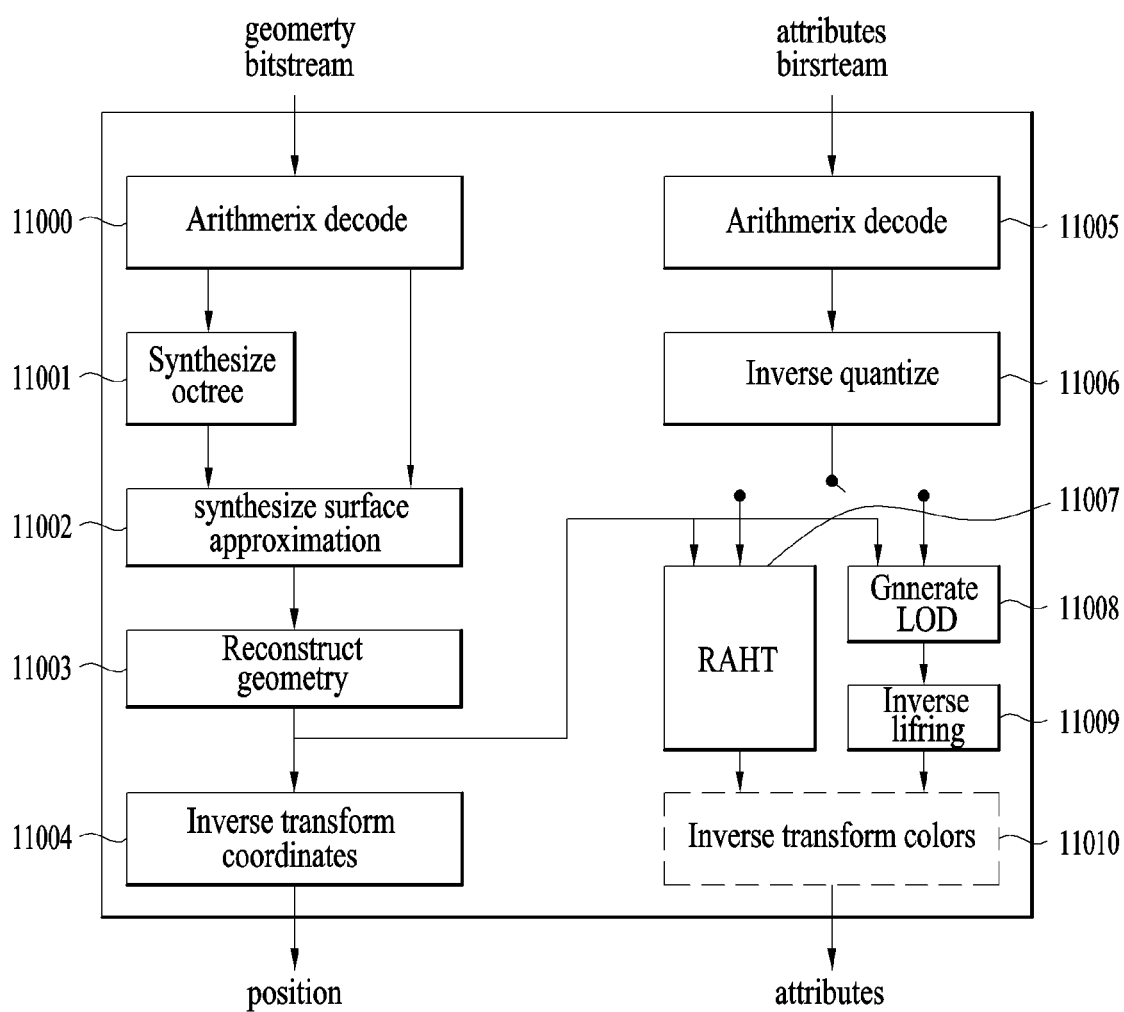
FIG. 11 illustrates a point cloud decoder according to embodiments.

FIG. 11 illustrates a point cloud decoder according to embodiments.

The point cloud decoder illustrated in FIG. 11 is an example of the point cloud decoder illustrated in FIG. 10, and may perform a decoding operation, which is an inverse process of the encoding operation of the point cloud encoder illustrated in FIGS. 1 to 9.

As described with reference to FIGS. 1 and 10, the point cloud decoder may perform geometry decoding and attribute decoding. The geometry decoding is performed before the attribute decoding.

The point cloud decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, the geometry reconstructor 11003, and the coordinate inverse transformer 11004 may perform geometry decoding. The geometry decoding according to the embodiments may include direct coding and trisoup geometry decoding. The direct coding and trisoup geometry decoding are selectively applied. The geometry decoding is not limited to the above-described example, and is performed as an inverse process of the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the inverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud encoder.

Although not shown in the figure, the elements of the point cloud decoder of FIG. 11 may be implemented by hardware including one or more processors or integrated circuits configured to communicate with one or more memories included in the point cloud providing device, software, firmware, or a combination thereof. The one or more processors may perform at least one or more of the operations and/or functions of the elements of the point cloud decoder of FIG. 11 described above. Additionally, the one or more processors may operate or execute a set of software programs and/or instructions for performing the operations and/or functions of the elements of the point cloud decoder of FIG. 11.

Figure 12:
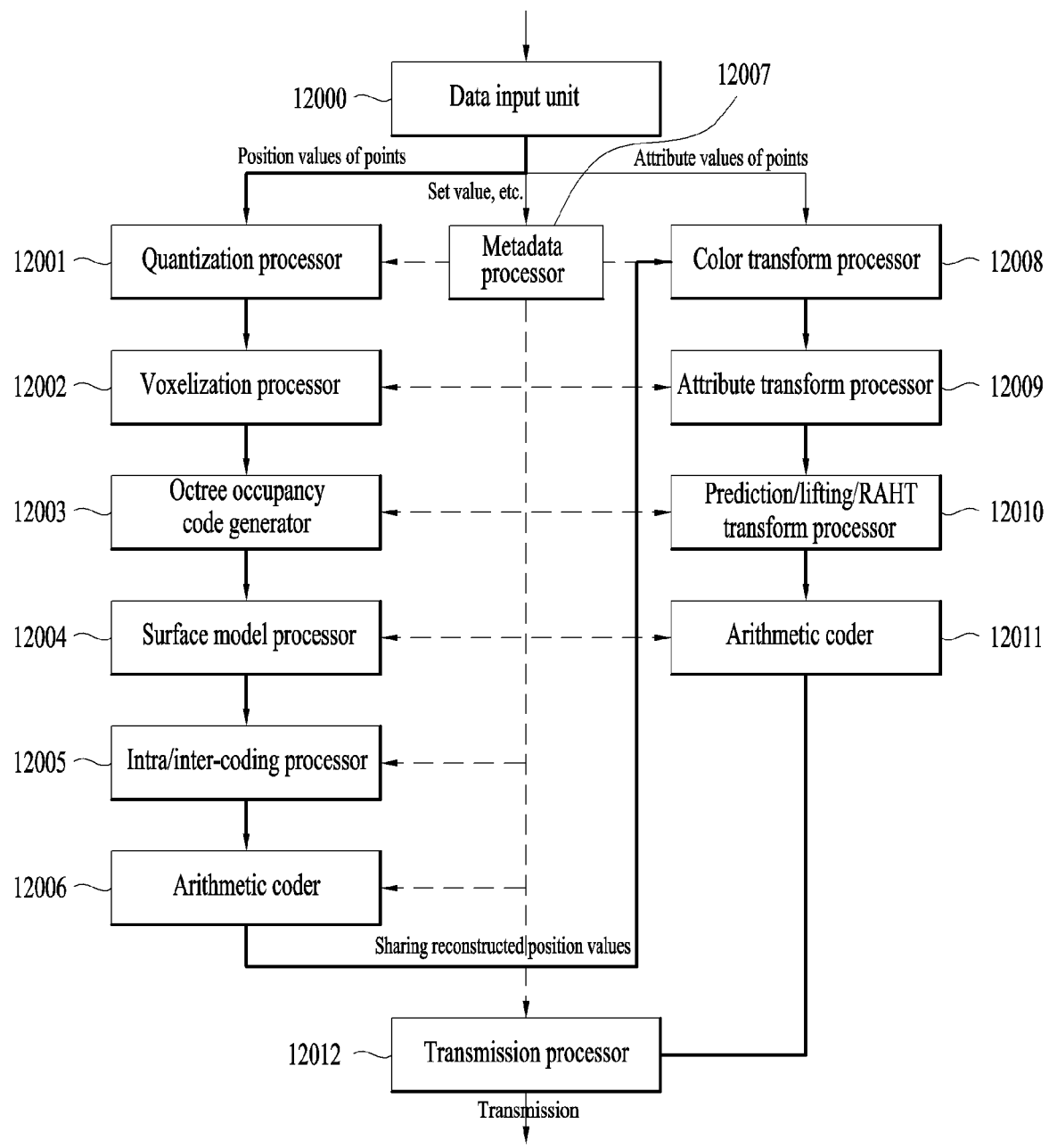
FIG. 12 illustrates a transmission device according to embodiments.

FIG. 12 illustrates a transmission device according to embodiments.

The transmission device shown in FIG. 12 is an example of the transmission device 10000 of FIG. 1 (or the point cloud encoder of FIG. 4). The transmission device illustrated in FIG. 12 may perform one or more of the operations and methods the same as or similar to those of the point cloud encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same as or similar to the operation and/or acquisition method of the point cloud video acquirer 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same as or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same as or similar to the operation and/or quantization of the quantizer 40001 described with reference to FIG. 4. Details are the same as those described with reference to FIGS. 1 to 9.

The voxelization processor 12002 according to the embodiments voxelizes the quantized position values of the points. The voxelization processor 120002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same as or similar to the operation and/or method of the point cloud encoder (or the octree analyzer 40002) described with reference to FIGS. 4 and 6. Details are the same as those described with reference to FIGS. 1 to 9.

The surface model processor 12004 according to the embodiments may perform trigsoup geometry encoding based on a surface model to reconstruct the positions of points in a specific region (or node) on a voxel basis. The surface model processor 12004 may perform an operation and/or method the same as or similar to the operation and/or method of the point cloud encoder (for example, the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same as or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same as or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same as or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same as or similar to the operation and/or method of the color transformer 40006 described with reference to FIG. 4 is performed. The detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same as or similar to the operation and/or method of the attribute transformer 40007 described with reference to FIG. 4. The detailed description thereof is omitted. The prediction/lifting/RAHT transform processor 12010 according to the embodiments may code the transformed attributes by any one or a combination of RAHT coding, prediction transform coding, and lifting transform coding. The prediction/lifting/RAHT transform processor 12010 performs at least one of the operations the same as or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same as or similar to the operation and/or method of the arithmetic encoder 400012.

The transmission processor 12012 according to the embodiments may transmit each bitstream containing encoded geometry and/or encoded attributes and metadata information, or transmit one bitstream configured with the encoded geometry and/or the encoded attributes and the metadata information. When the encoded geometry and/or the encoded attributes and the metadata information according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS) for signaling of a tile level, and slice data. The slice data may include information about one or more slices. One slice according to embodiments may include one geometry bitstream Geom00 and one or more attribute bitstreams Attr00 and Attr10.

A slice refers to a series of syntax elements representing the entirety or part of a coded point cloud frame.

The TPS according to the embodiments may include information about each tile (for example, coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same as or similar to the operation and/or transmission method of the transmitter 10003. Details are the same as those described with reference to FIGS. 1 and 2, and thus a description thereof is omitted.

Figure 13:
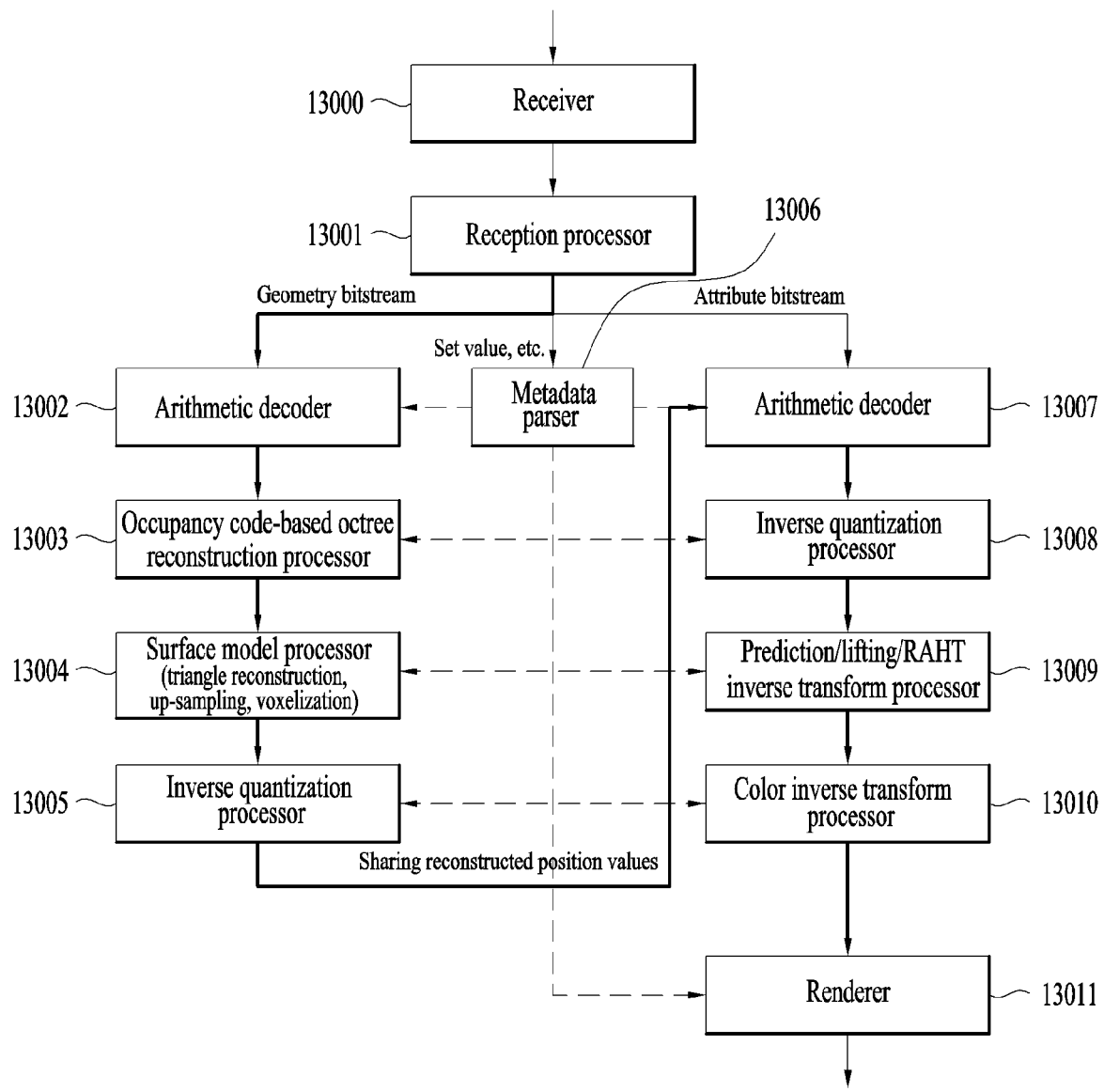
FIG. 13 illustrates a reception device according to embodiments.

FIG. 13 illustrates a reception device according to embodiments.

The reception device illustrated in FIG. 13 is an example of the reception device 10004 of FIG. 1 (or the point cloud decoder of FIGS. 10 and 11). The reception device illustrated in FIG. 13 may perform one or more of the operations and methods the same as or similar to those of the point cloud decoder described with reference to FIGS. 1 to 11.

The reception device according to the embodiment includes a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform an inverse process of the operation of a corresponding element for encoding according to the embodiments.

The receiver 13000 according to the embodiments receives point cloud data. The receiver 13000 may perform an operation and/or reception method the same as or similar to the operation and/or reception method of the receiver 10005 of FIG. 1. The detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 13005 may perform geometry decoding. The geometry decoding according to embodiments is the same as or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same as or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same as or similar to the operation and/or octree generation method of the octree synthesizer 11001. When the trisoup geometry encoding is applied, the surface model processor 13004 according to the embodiments may perform trisoup geometry decoding and related geometry reconstruction (for example, triangle reconstruction, up-sampling, voxelization) based on the surface model method. The surface model processor 13004 performs an operation the same as or similar to that of the surface approximation synthesizer 11002 and/or the geometry reconstructor 11003.

The inverse quantization processor 13005 according to the embodiments may inversely quantize the decoded geometry.

The metadata parser 13006 according to the embodiments may parse metadata contained in the received point cloud data, for example, a set value. The metadata parser 13006 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same as or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same as or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same as or similar to the operation and/or inverse quantization method of the inverse quantizer 11006.

The prediction/lifting/RAHT inverse transformer 13009 according to the embodiments may process the reconstructed geometry and the inversely quantized attributes. The prediction/lifting/RAHT inverse transform processor 13009 performs one or more of operations and/or decoding the same as or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same as or similar to the operation and/or inverse transform coding of the color inverse transformer 11010. The renderer 13011 according to the embodiments may render the point cloud data.

Figure 14:
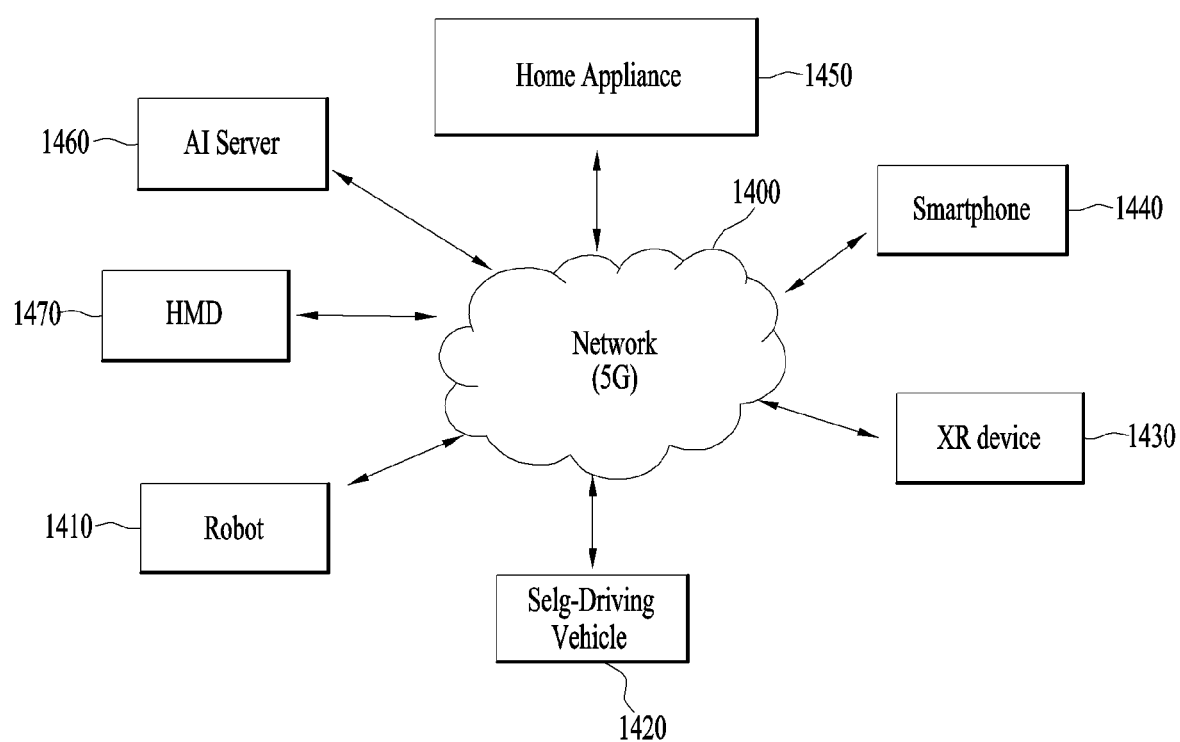
FIG. 14 illustrates an exemplary structure operable in connection with point cloud data transmission/reception methods/devices according to embodiments.

FIG. 14 illustrates an exemplary structure operable in connection with point cloud data transmission/reception methods/devices according to embodiments.

The structure of FIG. 14 represents a configuration in which at least one of a server 1460, a robot 1410, a self-driving vehicle 1420, an XR device 1430, a smartphone 1440, a home appliance 1450, and/or a head-mount display (HMD) 1470 is connected to the cloud network 1400. The robot 1410, the self-driving vehicle 1420, the XR device 1430, the smartphone 1440, or the home appliance 1450 is called a device. Further, the XR device 1430 may correspond to a point cloud data (PCC) device according to embodiments or may be operatively connected to the PCC device.

The cloud network 1400 may represent a network that constitutes part of the cloud computing infrastructure or is present in the cloud computing infrastructure. Here, the cloud network 1400 may be configured using a 3G network, 4G or Long Term Evolution (LTE) network, or a 5G network.

The server 1460 may be connected to at least one of the robot 1410, the self-driving vehicle 1420, the XR device 1430, the smartphone 1440, the home appliance 1450, and/or the HMD 1470 over the cloud network 1400 and may assist in at least a part of the processing of the connected devices 1410 to 1470.

The HMD 1470 represents one of the implementation types of the XR device and/or the PCC device according to the embodiments. The HMD type device according to the embodiments includes a communication unit, a control unit, a memory, an I/O unit, a sensor unit, and a power supply unit.

Hereinafter, various embodiments of the devices 1410 to 1450 to which the above-described technology is applied will be described. The devices 1410 to 1450 illustrated in FIG. 14 may be operatively connected/coupled to a point cloud data transmission device and reception according to the above-described embodiments.

<PCC+XR>

The XR/PCC device 1430 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 1430 may analyze 3D point cloud data or image data acquired through various sensors or from an external device and generate position data and attribute data about 3D points. Thereby, the XR/PCC device 1430 may acquire information about the surrounding space or a real object, and render and output an XR object. For example, the XR/PCC device 1430 may match an XR object including auxiliary information about a recognized object with the recognized object and output the matched XR object.

<PCC+XR+Mobile phone>

The XR/PCC device 1430 may be implemented as a mobile phone 1440 by applying PCC technology.

The mobile phone 1440 may decode and display point cloud content based on the PCC technology.

<PCC+Self-driving+XR>

The self-driving vehicle 1420 may be implemented as a mobile robot, a vehicle, an unmanned aerial vehicle, or the like by applying the PCC technology and the XR technology.

The self-driving vehicle 1420 to which the XR/PCC technology is applied may represent a self-driving vehicle provided with means for providing an XR image, or a self-driving vehicle that is a target of control/interaction in the XR image. In particular, the self-driving vehicle 1420 which is a target of control/interaction in the XR image may be distinguished from the XR device 1430 and may be operatively connected thereto.

The self-driving vehicle 1420 having means for providing an XR/PCC image may acquire sensor information from sensors including a camera, and output the generated XR/PCC image based on the acquired sensor information. For example, the self-driving vehicle 1420 may have an HUD and output an XR/PCC image thereto, thereby providing an occupant with an XR/PCC object corresponding to a real object or an object present on the screen.

When the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap an object on the screen. For example, the self-driving vehicle 1220 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

Hereinafter, a geometry encoding operation for effectively compressing the geometry information will be described.

As described with reference to FIGS. 1 to 14, the geometry (or called geometry information) of point cloud data according to embodiments represents positions of points. The positions of the points are indicated by parameters of a coordinate system representing a 3D space (e.g., parameters x, y, and z of three axes, an X-axis, a Y-axis, and a Z-axis representing the space). Attributes indicate the color (RGB, YUV, etc.) and/or reflectance of the points. As described with reference to FIGS. 1 to 14, the attributes are encoded based on the encoded geometry.

A point cloud data processing device according to embodiments may perform low-latency coding according to the characteristics of the content of the point cloud data. For example, when the point cloud data is data captured in real time from LiDAR or 3D map data transmitted in real time, the point cloud data processing device needs to process the point cloud data to minimize delay and have high compression efficiency.

As described with reference to FIG. 4, the geometry encoding according to the embodiments may include octree geometry coding, direct coding, trisoup geometry encoding, and entropy encoding. The direct coding and trisoup geometry encoding are applied selectively or in combination. Also, the geometry encoding according to the embodiments may include predictive tree encoding (or predictive geometry coding).

The predictive tree coding according to the embodiments is performed by defining a prediction structure for the point cloud data. This structure is represented by a predictive tree having a vertex associated with each point of the point cloud data. The predictive tree may include a root vertex and a leaf vertex, and vertices below the root vertex may have at least one child, and the depth increases toward the leaf vertex. Each vertex may be predicted from parent nodes in the predictive tree. For each vertex, various predictors (e.g., no prediction, delta prediction, linear prediction, a parallelogram predictor, etc.) may be used based on the positions of the parent, grand-parent, and grand-grandparent of the vertex. A predictive tree is encoded by traversing the tree in depth order and encoding the number of children at each vertex. In order to construct a predictive tree according to embodiments, points are re-sorted according to a reference (e.g., a Morton code, etc.). The predictive tree may be generated based on a Kdtree (or Kdtree data structure). The Kdtree structure is used to track a potential prediction variable. The first Kdtree is empty. Points are visited repeatedly in the order selected. K-nearest neighbors are determined in the Kdtree of the current point according to various references, and one of neighbors is selected as a predictor. Once the predictor is selected, the current vertex is added to the children of the vertices associated with the predictor. Then, the next predictor is generated based on the current vertex, and the predicted positions are added to the kdtree. This process is repeated until all points are traversed. At the end of this process, the predictive tree structure is determined. The predictive tree coding according to the embodiments may be performed using a coding algorithm.

As described with reference to FIGS. 6 to 8, the octree geometry coding is a method of scanning and coding all points in a breadth-first manner. The predictive tree coding according to the embodiments is a depth-first scheme. The point cloud data processing device (e.g., the point cloud data transmission device described with reference to FIGS. 1, 11, 14 and 15) according to the embodiments may sort the points by performing predictive tree coding, and generate a predictive tree by scanning the points step by step, generate a predicted value through the geometry between a parent node and a child node in the generated tree structure, and entropy-code a residual to output a geometry bitstream. The predictive tree coding eliminates the need to wait for all point cloud data to be captured because step-by-step scanning of all points is not performed. In addition, the predictive tree coding allows captured point cloud data to be progressively encoded, and is therefore suitable for point cloud data content that requires low-latency processing.

However, the depth-first scheme may increase the residual compared to the breadth-first scheme, in which the entire point cloud data is analyzed, thereby increasing the bitstream size. Also, since predictive tree coding is performed based on sorted points, the sorting order of the points has a great influence on predictive tree generation. That is, the points actually positioned at a close distance may not be configured as parent and child nodes of the predictive tree, but adjacently arranged points among the sorted points may be configured as parent and child nodes. Since the distance between points may be affected by the characteristics of the content of the point cloud data, that is, the density in the 3D space, it is necessary to consider the characteristics of the content in sorting the points.

Accordingly, in performing predictive tree coding, the point cloud data processing device according to the embodiments may adaptively re-sort the points according to the characteristics of the content of the point cloud data. In addition, the point cloud data transmission device according to the embodiments may generate signaling information related to the predictive tree, and transmit a bitstream containing the same to the point cloud data reception device (e.g., the point cloud data reception device described with reference to FIGS. 1, 13, 14 and 16). The point cloud decoder (e.g., the point cloud decoder described with reference to FIGS. 1, 13, 14, and 16) according to the embodiments perform the decoding operation of the predictive tree coding of the point cloud data processing device based on the signaling information related to the predictive tree.

Figure 15:
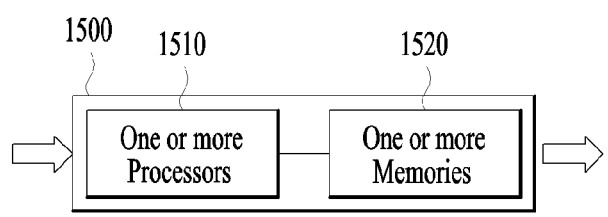
FIG. 15 is an exemplary block diagram of a point cloud data processing device according to embodiments.

FIG. 15 is an exemplary block diagram of a point cloud data processing device according to embodiments.

The point cloud data processing device 1500 shown in FIG. 15 is an example of the transmission device 10000 described with reference to FIG. 1, the point cloud encoder 10002 described with reference to FIG. 4, or the transmission device described with reference to FIG. 12. The point cloud data processing device 1500 according to the embodiments includes one or more processors 1510 and one or more memories 1520 electrically and communicatively coupled with the one or more processors. Although the one or more processors 1510 are represented as a single block in the figure for simplicity, they may be configured as one or more physically separated hardware processors, or may be configured as a combination of software/hardware or a single hardware processor. The one or more processors 1520 according to the embodiments may be electrically and communicatively coupled with each other. Although the one or more memories 1520 are represented as a single block in the figure for simplicity, they may be configured as one or more physically separated memories or as one memory. The one or more memories according to the embodiments may store one or more programs for processing point cloud data.

The one or more processors 1510 according to the embodiments receive point cloud data (e.g., captured LiDAR data, 3D map data transmitted in real time, etc.) as an input, perform geometry encoding for encoding the geometry, and performs attribute encoding for encoding the attributes based on the encoded geometry. The geometry encoding and attribute encoding according to the embodiments may be performed using a coding algorithm.

The one or more processors 1510 according to the embodiments may include processors that perform geometry encoding and attribute encoding, respectively.

The geometry encoding of the one or more processors 1510 according to the embodiments may include one or more of the operations of the coordinate transformer 40000, the quantizer 40001, the octree analyzer 40002, the surface approximation analyzer 40003, the arithmetic encoder 40004, and the geometry reconstructor 40005 described with reference to FIG. 4, and one or more of the operations of the data input unit 12000, the quantization processor 12001, the voxelization processor 12002, the octree occupancy code generator 12003, the surface model processor 12004, the intra/inter-coding processor 12005, and the arithmetic coder 12006.

The attribute encoding of the one or more processors 1510 according to the embodiments may include one or more of the operations of the color transformer 40006, the attribute transformer 40007, the RAHT transformer 40008, the LOD generator 40009, the lifting transformer 40010, the coefficient quantizer 40011, and/or the arithmetic encoder 40012 described with reference to FIG. 4, and one or more of the operations of the color transform processor 12008, the attribute transform processor 12009, the prediction/lifting/RAHT transform processor 12010, and the arithmetic coder 12011 described with reference to FIG. 12.

At least one of the elements of the point cloud encoder described with reference to FIG. 4 and the elements of the transmission device described with reference to FIG. 12 may correspond to the process of at least one of the one or more processors 1510.

The encoded geometry is output as the geometry bitstream described with reference to FIGS. 1 to 14, and the encoded attribute is output as the attribute bitstream described with reference to FIGS. 1 to 14. The geometry bitstream and the attribute bitstream may be multiplexed into one bitstream and output.

Figure 16:
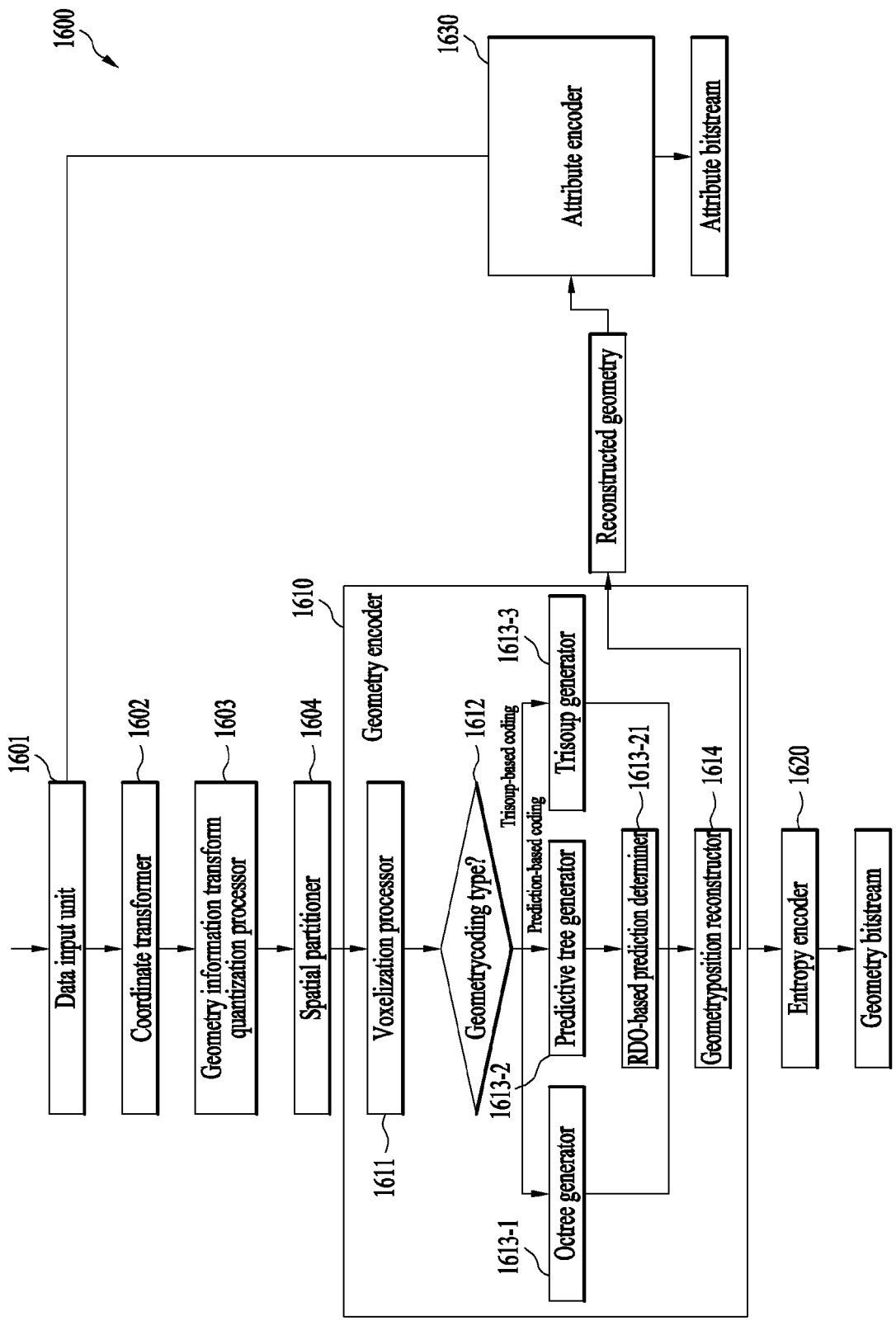
FIG. 16 is a flowchart illustrating a point cloud data processing method according to embodiments.

FIG. 16 is a flowchart illustrating a point cloud data processing method according to embodiments.

The flowchart 1600 of FIG. 16 illustrates an example of a data processing method for the point cloud data processing device 1500 described with reference to FIG. 15. For simplicity, the flowchart 1600 is expressed based on the elements of the point cloud data processing device described with reference to FIG. 15. At least one element disclosed in FIG. 16 may correspond to the elements of the at least one processor described with reference to FIG. 15, the transmission device 10000 described with reference to FIG. 1, the point cloud encoder 10002 described with reference to FIG. 4, and the transmission device described with reference to FIG. 12, and the names or functions thereof are not limited to this example.

The data input unit of the point cloud data processing device receives point cloud data (geometry, attributes, and signaling information (or parameters)) (1601).

The coordinate transformer (e.g., the coordinate transformer 40000 described with reference to FIG. 4) of the point cloud data processing device may receive the positions and transforms the same into coordinates (1602). The operation of the coordinate transformer is the same as that described with reference to FIG. 4, and thus a detailed description thereof will be omitted.

The geometry information transform quantization processor (e.g., the quantizer 40001 of FIG. 4 and the quantization processor 12001 of FIG. 12) quantizes the geometry (1603). The operation of the quantization processor is the same as that described with reference to FIGS. 4 and 12, and thus a detailed description thereof will be omitted.

The spatial partitioner may partition the space in which the point cloud data is distributed into tiles, slices, or the like (1604).

The geometry encoder 1610 performs the geometry encoding described with reference to FIGS. 1 to 14. The elements of the geometry encoder 1610 and the geometry encoder 1610 may be configured as a processor, a hardware encoder, software, or a combination of hardware and software as described with reference to FIG. 15.

The voxelization processor (e.g., the quantizer 40001 of FIG. 4 and the voxelization processor 12002 of FIG. 12) included in the geometry encoder 1610 performs voxelization based on the quantized positions to reconstruct the quantized points (1611). Since the operation of the voxelization processor is the same as that described with reference to FIGS. 4 and 12, a detailed description thereof will be omitted.

The geometry encoder 1610 determines a geometry coding (geometry encoding) type (1612). As described with reference to FIG. 15, the geometry coding includes octree geometry coding, predictive tree coding, and trisoup geometry encoding. When the geometry coding indicates the octree geometry coding, the octree generator generates an octree and performs octree geometry coding (1613-1). When the geometry coding indicates the predictive tree coding, the predictive tree generator generates a predictive tree and performs predictive tree coding (1613-2). When the geometry coding indicates the trisoup geometry coding, the trisoup generator generates an octree and performs trisoup geometry coding (1613-3). The prediction determiner may select an optimal prediction mode by performing rate distortion optimization (RDO) based on the generated predictive tree, and may generate a predicted value based on the selected optimal prediction mode (1614). The geometry position reconstructor (e.g., the geometry reconstructor 40005 in FIG. 4) according to the embodiments reconstructs the geometry processed in at least one of the octree geometry coding, the predictive tree encoding, and the trisoup geometry coding, and outputs the reconstructed geometry (1614). Since the operation of the geometry position reconstructor is the same as that described with reference to FIGS. 4 and 12, a detailed description thereof will be omitted.

The entropy encoder (e.g., the arithmetic coder 12006 described with reference to FIG. 12) entropy-codes a residual value from the predicted value to output a geometry bitstream. Since the operation of the entropy encoder is the same as that described with reference to FIGS. 4 and 12, a detailed description thereof will be omitted. The entropy encoder may be included in the geometry encoder 1610.

The reconstructed geometry is delivered to the attribute encoder 1630. The attribute encoder 1630 performs the attribute encoding described with reference to FIGS. 1 to 14. The attribute encoder 1630 may be configured as a processor, a hardware encoder, software, or a combination of hardware and software as described with reference to FIG. 15.

Since the attribute encoding is the same as that described with reference to FIGS. 1 to 14, a detailed description thereof will be omitted. The encoded attribute is output in the form of a bitstream.

As described with reference to FIGS. 15 to 16, the point cloud data processing device (or a prediction determiner) may generate a predictive tree by sorting the points and perform predictive tree coding. The predictive tree coding may be applied at a sequence, tile, or slice level corresponding to the entire point cloud data. The point cloud data processing device according to the embodiments sorts the points according to a reference (e.g., Morton code, azimuth, etc.) and generates a kd tree to generate a predictive tree.

However, since the density of points is not constant according to the characteristics of content, points that are actually closer to each other may be present at the same azimuth or the same radius. That is, when the points are sorted based on only one criterion without considering the characteristics of the content, the optimal order of points for constructing a predictive tree may not be secured. In addition, when the residual secured based on the predictive tree increases, the size of the bitstream may increase, thereby hindering efficient compression.

Accordingly, in performing predictive tree coding, the point cloud data processing device according to the embodiments sorts the points in consideration of the characteristics of the content and generates a predictive tree.

The point cloud data processing device according to the embodiments may sort the points based on various references such as Morton code, radius, azimuth, elevation, LiDAR sensor ID or capture time sequence. The references according to the embodiments are changed according to the characteristics of the content. For example, for content in the form of spinning data captured by LiDAR equipment, it is more efficient to generate a predictive tree by performing sorting based on azimuth. This sorting method is transmitted to the point cloud data reception device through signaling information.

The predictive tree according to the embodiments is generated by at least one or more predictive tree generation methods. A predictive tree generation pseudo code representing a predictive tree generation method is used to represent a coding algorithm used for geometry encoding and geometry decoding. In addition, information related to the predictive tree generation method according to the embodiments is transmitted to the point cloud data reception device through signaling information related to the predictive tree contained in the bitstream.

When the predictive tree is generated based on the order in which points are sorted, the predictive tree generation pseudo code representing the sorted order-based predictive tree generation method according to the embodiments is expressed as follows.

Points[ ]: Indicates an array of all points
pointCount: Indicates the total number of points.
KDTree (kd tree): Indicates a kd tree used for neighbor node search.
1. for (i=0; I<pointCount; i++) {
A. P=Points[i]: Indicates the i-th point that is sequentially sorted and input.
B. Search the kd tree for a neighbor near the point P.
C. If there is no search result, register the point P as a node in the kd tree.
D. If there is a search result, check the number of children of the original node connected to the corresponding node in the kd tree. If the number is less than or equal to 3, register the nodes as children of the original node. If the number is greater than 3, check the next nearest nodes. If the number of the nodes is less than or equal to 3, register are the nodes as children of the node.
E. Register the predicted results of point P (3 results except the point) as nodes of the Kd tree.
2.}

In operation E, the predicted results of the point P correspond to the results predicted from a parent node, the results predicted from a grandparent and the parent node, or the results predicted from a grand-grandparent, the grandparent, and the parent node.

A point having the most influence may be set as a root node, and the predictive tree according to the embodiments may be generated based on the influence. The influence according to the embodiments may be determined based on the degree to which other points are selected as neighbor points, similarity to a color registered as a neighbor point, and the like.

A predictive tree generation pseudo code representing a distance-based influence-based predictive tree generation method according to the embodiments a is expressed as follows.

Points[ ]: Indicates an array of all points
pointCount: Indicates the total number of points.
second_sorted_indexes[ ]: Indicates an index array of points finally sorted according to the above-described pseudo code.
KDTree (kd tree): Indicates a kd tree used for neighbor node search.
max_distance: the maximum distance allowed for a parent node
1. for (i=0; I<pointCount; i++) {
A. P=Points[i]: Indicates the i-th point that is sequentially sorted and input.
B. Search the Kd tree for a neighbor near the point P.
C. If there is no search result, register the point p as a node in the Kd tree.
D. If there is a search result,
i. When the distance between the three searched points and the target point is less than max_distance, register the points as children a child of the connected (original) node.
E. Register the predicted results of point P (the three points except the point) as nodes of the Kd tree.
2.}

In operation E, the predicted results of the point P correspond to the results predicted from a parent node, the results predicted from a grandparent and the parent node, or the results predicted from a great-grandparent, the grandparent, and the parent node.

The influence according to the embodiments may be determined according to the number of child nodes of a node to which the target point corresponds. That is, the number of child nodes increases, the node is considered to have more influence. When there are two or more points having the same number of child nodes, the earliest point in the index order of the points may be selected, or a point with the most influence may be selected in consideration of attribute similarity between the node and child nodes.

When the influence is determined based on the number of child nodes, the predictive tree generation pseudo code according to the embodiments is expressed as follows.
1. Select a node having the largest number of child nodes as the root node.
2. Register three nodes with the largest number of child nodes from the root node as child nodes.
3. Repeat the steps until all nodes are registered in the predictive tree (Return to Step 1).

That is, the point cloud data processing device may register three or more child nodes according to the predictive tree generation pseudo code representing the above-described distance-based influence-based predictive tree generation method, and may optionally register three child nodes having the most influence based on the number of child nodes.

Since the predictive tree according to the embodiments is generated by determining a point having the most influence as a root node, points having a small residual are highly likely to be selected as neighbor nodes. Accordingly, the residual value may decrease, and thus the size of the bitstream may be reduced.

The influence according to the embodiments may be determined based on similarity in attribute between points.

Pseudo code for generating a predictive tree based on influence based on attribute similarity according to the embodiments is configured as follows.
1. for (i=0; I<pointCount; i++) {
A. P=Points[i]: Indicates points that are sequentially input.
B. Search the Kd tree for a neighbor near the point P.

C. If there is no search result, register the point p as a node in the Kd tree.
D. If there is a search result,
i. When the distance between the three searched points and the target point is less than max_distance, register the points as children a child of the connected (original) node.
E. Register the predicted results of point P (the three points except the point) as nodes of the Kd tree.
2.}
3. for (i=0; I<pointCount; i++) {
i. P=Points[i]
ii. Calculate the average of the attributes of the children of the node connected to P (wherein the average may be calculated as an absolute average or a weighted average obtained by applying the distance between nodes as a weight).
4.}

The influence according to the embodiments may be determined based on similarity in attribute between a node and child nodes of the node. That is, the influence is considered to increase as the difference between the attribute of a node and the average (or weighted average) attribute of the child nodes decreases. When one or more nodes have high attribute similarity, the point cloud processing device according to the embodiments may generate a predictive tree, considering the above-described distance-based influence as well.

The pseudo code for generating a predictive tree based on attribute similarity according to the embodiments is configured as follows.

1. Select a node having the smallest difference between the attribute (e.g., color) of the node and the average of the attributes of the child nodes as the root node.
2. If there are several nodes having the smallest attribute difference, select a node having the largest number of child nodes as the root node.
3. Register three nodes with high attribute similarity from the root node as child nodes.
4. Repeat the steps from step 1 until all nodes are registered in the tree.

That is, the point cloud data processing device may register three or more child nodes according to the predictive tree generation pseudo code representing the above-described distance-based influence-based predictive tree generation method, and may optionally register three child nodes having the most influence based on the attribute similarity.

Since the predictive tree according to the embodiments is constructed from points having a high influence, points having a small residual are likely to be selected as neighbor nodes. The bitstream size may be reduced.

According to embodiments, the attribute similarity may be measured based on at least one of Euclidian color distance measurement, Correlated Color Temperature (CCT) measurement, CIE94 (color difference model) measurement.

The method of measuring the Euclidean color distance according to the embodiments is expressed as the following equation.

$$\text{color distance} = \sqrt{(R2 - R1)^2 + (G2 - G1)^2 + (B2 - B1)^2}$$

When the attribute indicates a color as described above, the color distance is measured based on the difference between RGB values of two points (e.g. R1, G1, and B1, which are the RGB values of the first point and R2, G2, and B2, which are the RGB values of the second point).

$$\text{reflectance distance} = |R2 - R1|$$

When the attribute indicates reflectance as described above, the reflectance distance is measured based on the difference between the RGB values of the two points.

The CCT measurement method according to the embodiment is expressed as the following equations.

$$X = (-0.14282)R + (1.54924)G + (-0.95641)B$$
$$Y = (-0.32466)R + (1.57837)G + (-0.73191)B = \text{illunimance}$$
$$Z = (-0.68202)R + (0.77073)G + (0.56332)B$$
$$x = \frac{X}{(X+Y+Z)}, y = \frac{Y}{(X+Y+Z)}$$

In the equations, X, Y, and Z denote CIE tristimulus values, and R, G, and B denote RBG values. (x,y) denotes colorimeter chromaticity coordinates. The CCT is calculated by changing RGB values to CIE (XYZ) values and normalizing the changed values to chromatic values. The constants included in the equations are elements in the correlation matrix. The CCT is determined based on the absolute error value less than 2 degree Kelvin and Mc Camy's formula for a specific (x,y) as shown in the following equation.

$$CCT = 449n^3 + 3525n^2 + 6823.3n + 5520.33$$
$$n = \frac{(x - 0.3320)}{(0.1858 - y)}$$

The CIE94 (color difference model) measurement method according to the embodiments is expressed as the following equation.

$$\Delta E94 = \sqrt{\left(\frac{\Delta L}{K_L S_L}\right)^2 + \left(\frac{\Delta Cab}{K_C S_C}\right)^2 + \left(\frac{\Delta Hab}{K_L S_L}\right)^2}$$
$$\Delta L = L_1 - L_2$$
$$C1 = \sqrt{a1^2 + b1^2}, C2 = \sqrt{a2^2 + b2^2}, Cab = C1 - C2$$
$$\Delta H_{ab} = \sqrt{\Delta E_{ab}^2 - \Delta L^2 - \Delta C_{ab}^2} = \sqrt{\Delta a^2 - \Delta b^2 - \Delta C_{ab}^2}$$
$$\Delta a = a1 - a2, \Delta b = b1 - b2$$
$$S_L = 1, Sc = 1 + K_1 C_1, SH = 1 + K_2 C_1$$

Here, E94 denotes the distance matrix delta E of the CIE94 model. Parameters L, a and b are parameters of the CIELAB color space representing represent the colors C1 and C2, respectively. $H_{ab}$ corresponds to the arithmetic mean of the code lengths of identical chroma circles of two colors.

A predictive tree according to embodiments may be generated by registering an N-th point (e.g., a point corresponding to a center index) as a root node based on the order of the sorted points and traversing the points in order of right and left. A predictive tree generation pseudo code representing a method of generating a predictive tree based on the center position corresponding to the center index or the N-th position is expressed as follows.

ctrIdx: Indicates the center index or the N-th index of the sorted points.

prevIdx: Indicates the previous index.

pointCount: Indicates the total number of points.

1. ctrIdx=pointCount/2: Indicates a point corresponding to the center index (half of the total number of points) or the N-th index.
2. direction=start traversal from the center index to right.
3. prevIdx=ctrIdx: Indicates that the previous index is the center index or an N-th index.
4. for (i=ctrIdx; (i>=0) && (i<pointCount);) {
   A. P=Points[i]: Indicates the i-th point corresponding to ctrIdx, where i is greater than or equal to 0 and less than the total number of points.
   B. Search the Kd tree for a neighbor near the point P.
   C. If there is no search result, register the point p as a node in the Kd tree.
   D. If there is a search result, check the number of children of the original node connected to the corresponding node in the kd tree. If the number is less than or equal to 3, register the nodes as children of the original node. If the number is greater than 3, check the next nearest node. If the number of the nodes is less than or equal to 3, register the nodes as children of the node.
   E. Register the predicted results of point P (three points except the point) as nodes of the Kd tree.
   F. If direction=right:
   1. direction=left: traverse to left, i=prevIdx−1
   G. else
   1. direction=right: traverse to right, i=prevIdx+1
   H. prevIdx=i
5.}

The predicted results of the point P correspond to the results predicted from a parent node, the results predicted from a grandparent node and the parent node, or the results predicted from a great-grandparent node, the grandparent node, and the parent node. Since the order of inputs to the Kd tree spreads to both side of the sorted points, the probability of finding closer points is high. Accordingly, the size of the bitstream may be reduced by decreasing the residual.

The geometry encoder 1610 (or the predictive tree generator) of the point cloud data transmission device (e.g., the point cloud data processing device of FIG. 15) according to the embodiments may receive the entire sequence of the bitstream (the points transmitted by the bitstream) and/or signaling information related to the predictive tree for a partial point cloud such as tiles or slices, and perform predictive tree coding (or predictive tree geometry coding). For example, the point cloud data transmission device may receive information about a point sorting method (e.g., Morton code order, Radius order, etc.) and sort the points. In addition, the point cloud data transmission device may receive information about the above-described predictive tree generation method, and generate a predictive tree using a coding algorithm (e.g., the above-described predictive tree generation pseudo code) according to the input information. The predictive tree generation method according to the embodiments corresponds to at least one of the above-described sorted order-based predictive tree generation, distance-based influence-based predictive tree generation, attribute similarity-based influence-based predictive tree generation, or predictive tree generation based on the N-th position or center position in the sorted order. The predictive tree generation method may be selected based on the characteristics of content of point cloud data, a service type, and the like. When a predictive tree is to be generated using the method of distance-based influence-based predictive tree generation, the point cloud data transmission device according to the embodiments receives an input of the maximum distance (e.g., max_distance) allowed for a parent node. The point cloud data transmission device may search for neighbor predicted points for selecting a parent node, and register only points having a distance from the searched points less than the maximum distance as child nodes. The point cloud data transmission device according to embodiments may automatically set or calculate the maximum distance by analyzing the content.

The point cloud data transmission device may receive information related to an attribute similarity measurement method (e.g., Euclidean color distance measurement, CCT measurement, CIE94 measurement, etc.) and calculate the attribute similarity. The point cloud data transmission device according to the embodiments may measure the attribute similarity to generate a predictive tree based on at least one of the method of distance-based influence-based predictive tree generation and the method of attribute similarity-based influence-based predictive tree generation.

To generate a predictive tree using the predictive tree generation method based on the N-th position or center position in the sorted order, the point cloud data transmission device receives information related to the value of N as an input.

In addition, the point cloud data transmission device according to the embodiments may generate signaling information related to the predictive tree and transmit a bitstream containing the same to the point cloud data reception device (e.g., the point cloud data reception device described with reference to FIGS. 1, 13, 14 and 16). Based on the signaling information related to the predictive tree, the point cloud decoder according to the embodiments (e.g., the point cloud decoder described with reference to FIGS. 1, 13, 14, and 16) may perform predictive tree decoding (or predictive tree geometry decoding), which is a decoding operation of the predictive tree coding of the point cloud data processing device.

Figure 17:
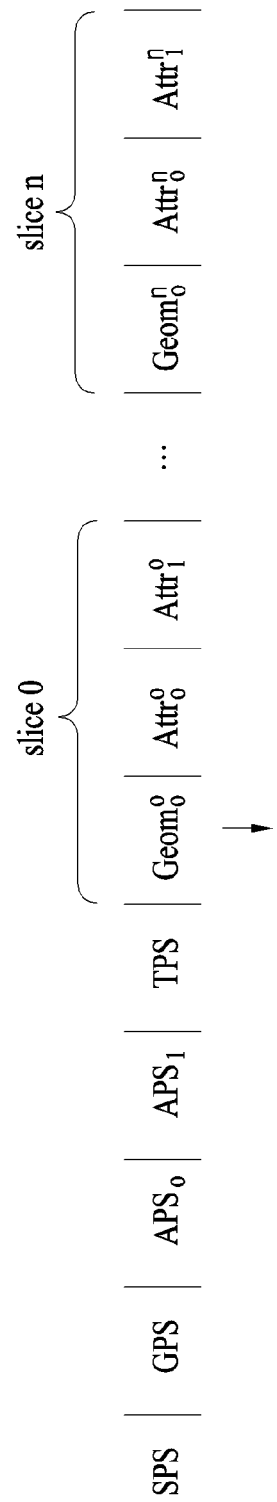
FIG. 17 illustrates a configuration of a bitstream according to embodiments.

FIG. 17 illustrates a configuration of a bitstream according to embodiments.

A point cloud data processing device (e.g., the transmission device described with reference to FIGS. 1, 12 and 14) may transmit encoded point cloud data in the form of a bitstream. The bitstream is a sequence of bits that form a representation of point cloud data (or a point cloud frame).

The point cloud data (or point cloud frame) may be partitioned into tiles and slices.

The point cloud data may be partitioned into multiple slices and encoded within the bitstream. A slice is a set of points, and is expressed as a series of syntax elements representing the entirety or a part of the encoded point cloud data. A slice may or may not have a dependency on other slices. Also, a slice may include one geometry data unit, and may have one or more attribute data units or zero attribute data unit. As described above, the attribute encoding is performed based on the geometry encoding, and accordingly the attribute data units are based on the geometry data unit within the same slice. In other words, the point cloud data reception device (e.g., the reception device 10004 or the point cloud video decoder 10006) may process the attribute data based on the decoded geometry data. Therefore, in a slice, the geometry data unit precedes the associated attribute data units. Data units within a slice are necessarily consecutive, and the order of slices is not specified.

A tile is a (three-dimensional) rectangular cuboid within a bounding box (e.g., the bounding box described with reference to FIG. 5). The bounding box may contain one or more tiles. A tile may completely or partially overlap another tile. A tile may include one or more slices.

Accordingly, the point cloud data processing device may provide high-quality point cloud content by processing data corresponding to tiles according to importance. That is, the point cloud data processing device according to the embodiments may perform point cloud compression coding with better compression efficiency and appropriate latency on data corresponding to a region important to the user.

A bitstream according to embodiments contains signaling information and a plurality of slices (slice 0, . . . , slice n). As shown in the figure, the signaling information precedes the slices in the bitstream. Accordingly, the point cloud data reception device may first obtain the signaling information and sequentially or selectively process the plurality of slices based on the signaling information. As shown in the figure, slice0 contains one geometry data unit (Geom0$^0$) and two attribute data units (Attr0$^0$ and Attr1$^0$). The geometry data unit precedes the attribute data units within the same slice. Accordingly, the point cloud data reception device first processes (decodes) the geometry data unit (or geometry data), and processes the attribute data units (or attribute data) based on the processed geometry data. The signaling information according to the embodiments may be referred to as signaling data, metadata, or the like, and is not limited to the examples. In addition, the signaling information according to the embodiments may be generated by the point cloud data transmission device (e.g., the metadata processor 12007 described with reference to FIG. 12), and may be parsed and used for decoding by the point cloud data reception device (e.g., the metadata parser 13006 or the like described with reference to FIG. 13).

According to embodiments, the signaling information includes a sequence parameter set (SPS), a geometry parameter set (GPS), and one or more attribute parameter sets (APSs). The SPS is encoding information about the entire sequence, such as a profile or a level, and may include comprehensive information (sequence level) about the entire sequence, such as a picture resolution and a video format. The GPS is information about geometry encoding applied to geometry included in the sequence (bitstream). The GPS may include information about an octree (e.g., the octree described with reference to FIG. 6) and information about an octree depth. The APS is information about attribute encoding applied to an attribute contained in the sequence (bitstream). As shown in the figure, the bitstream contains one or more APSs (e.g., APS0, APS1, . . . shown in the figure) according to an identifier for identifying the attribute.

According to embodiments, the signaling information may further include information about a tile (e.g., tile inventory). The information about the tile may include a tile identifier and information about a tile size. According to embodiments, the signaling information is applied to a corresponding bitstream as information about a sequence, that is, a bitstream level. In addition, the signaling information has a syntax structure including a syntax element and a descriptor describing the same. A pseudo code may be used to describe the syntax. In addition, the point cloud reception device (e.g., the reception device 10004 of FIG. 1, the point cloud decoder of FIGS. 10 and 11, or the reception device of FIG. 13) may sequentially parse and process syntax elements presented in the syntax.

Although not shown in the figure, the geometry data unit and the attribute data unit include a geometry header and an attribute header, respectively. The geometry header and the attribute header are signaling information applied at a corresponding slice level and have the above-described syntax structure.

The geometry header contains information (or signaling information) for processing a corresponding geometry data unit. Therefore, the geometry header is at the leading position in the geometry data unit. The point cloud reception device may process the geometry data unit by parsing the geometry header first. The geometry header has an association with the GPS, which contains information about the entire geometry. Accordingly, the geometry header contains information specifying gps_geom_parameter_set_id included in the GPS. The geometry header also contains tile information (e.g., tile_id), a tile identifier, and the like related to a slice to which the geometry data unit belongs.

The attribute header contains information (or signaling information) for processing a corresponding attribute data unit. Accordingly, the attribute header is at the leading position in the attribute data unit. The point cloud reception device may process the attribute data unit by parsing the attribute header first. The attribute header has an association with the APS, which contains information about all attributes. Accordingly, the attribute header contains information specifying aps_attr_parameter_set_id included in the APS. As described above, attribute decoding is based on geometry decoding. Accordingly, the attribute header contains information specifying a slice identifier contained in the geometry header in order to determine a geometry data unit associated with the attribute data unit.

In the case where the point cloud transmission device performs predictive tree coding based on the predictive tree generation method described with reference to FIGS. 15 and 16, the signaling information in the bitstream may further include signaling information related to a predictive tree (e.g., information about a point sorting method, a predictive tree generation method, etc.). The signaling information related to the predictive tree according to the embodiments may be included in the signaling information (e.g., SPS, APS, etc.) of a sequence level, a slice level (e.g., the attribute header, etc.), an SEI message, or the like. The point cloud reception device according to the embodiments (e.g., the reception device 10004 of FIG. 1, the point cloud decoder of FIGS. 10 and 11, or the reception device of FIG. 13) may receive a bitstream, and perform predictive tree decoding, which is a decoding operation of predictive tree coding, based on the signaling information related to the predictive tree. Specifically, when the signaling information related to the predictive tree is signaled at the sequence level, the point cloud reception device performs predictive tree decoding on the point cloud data corresponding to the sequence of the bitstream based on the signaling information related to the predictive tree. When the signaling information related to the predictive tree is signaled at the tile level, the point cloud reception device performs predictive tree decoding on the point cloud data corresponding to the tile based on the signaling information related to the predictive tree. When the signaling information related to the predictive tree is signaled at the slice level, the point cloud reception device performs predictive tree decoding on the point cloud data corresponding to the slice based on the signaling information related to the predictive tree. Accordingly, the point cloud reception device may perform predictive tree decoding on all or some regions (e.g., tiles, slices, etc.) of the point cloud data based on the signaling information.

FIG. 18 shows an example of a syntax structure of signaling information related to a predictive tree.

FIG. 18 shows an example of a syntax structure of an SPS. In the example, the signaling information related to a predictive tree is included in an SPS of a sequence level.

profile_idc: Indicates a profile to which the current bitstream conforms.

profile_compatibility_flags: Indicates whether there is a profile compatible with the profile to which the bitstream conforms.

sps_num_attribute_sets: Indicates the number of encoded attributes contained in the bitstream. The value of sps_num_attribute_sets shall be in the range of 0 to 63.

attribute_dimension[i]: Indicates the number of components of the i-th attribute.

attribute_instance_id[i]: Indicates the instance id of the i-th attribute.

pred_geom_tree_sorting_type: Indicates a point sorting method to be applied in generating a predictive geometry tree in a corresponding sequence.

pred_geom_tree_sorting_type may have values from 0 to 6, each of which indicates the following sorting method.
- 0=no sorting
- 1=Sorting in Morton code order
- 2=Sorting in radius order
- 3=Sorting in azimuth order
- 4=Sorting in elevation order
- 5=Sorting in order of sensor ID
- 6=Sorting in capture time order The values of pred_geom_tree_sorting_type are changeable and are not limited to the above example.

When the value of pred_geom_tree_sorting_type is greater than 0, the syntax of the SPS further includes pred_geom_tree_sorting_ascending_flag.

pred_geom_tree_sorting_ascending_flag: Indicates whether to sort points in ascending order (TRUE) or in descending order (FALSE) when the points are sorted first in generating a predictive tree (also called a predictive geometry tree) in the corresponding sequence. When the value of pred_geom_tree_sorting_ascending_flag is TRUE, it indicates that the points are sorted in ascending order in generating the predictive tree. When the value of pred_geom_tree_sorting_ascending_flag is FALSE, it indicates that the points are sorted in descending order in generating the predictive tree. The values of pred_geom_tree_sorting_ascending_flag are not limited to this example and may be changed.

pred_geom_tree_build_method: Indicates a method of generating a predictive tree (or a predictive geometry tree) in the sequence.

pred_geom_tree_build_method may have values from 0 to 4, each of which indicates a predictive tree generation method:
- 0=Sorted order-based predictive tree generation;
- 1=Distance-based influence-based predictive tree generation;
- 2=Attribute similarity-based influence-based predictive tree generation;
- 3=Zigzag direction-based predictive tree generation based on the N-th position in sorted order;
- 4=Zigzag direction-based predictive tree generation based on the center position in sorted order.

The values of pred_geom_tree_build_method are changeable and are not limited to the above example. Details of the method of generating a predictive tree according to the embodiments is the same as those described with reference to FIGS. 15 to 16, and thus a description thereof will be omitted.

When pred_geom_tree_build_method indicates the method of distance-based influence-based predictive tree generation for generating a predictive tree based on distance-based influence or attribute similarity-based influence-based predictive tree generation, the syntax of the SPS further includes neighbor_attr_different_method.

neighbor_attr_different_method: Indicates an attribute similarity measurement method to be applied in the corresponding sequence. neighbor_attr_different_method has values from 1 to 3, and each value indicates a measurement method as follows:
- 1=Euclidean color distance measurement;
- 2=Correlated color temperature (CCT) measurement;
- 3=CIE94 (color difference model) measurement.

Since the attribute similarity measurement method is the same as the above-described equation, a detailed description thereof will be omitted.

When pred_geom_tree_build_method indicates the method of zigzag direction-based predictive tree generation based on the N-th position in sorted order, the syntax of the SPS includes pred_geom_tree_N_idx.

pred_geom_tree_N_idx: Indicates the position (e.g., the N-th index) of a root node to be applied in the sequence.

The SPS syntax according to the embodiments is not limited to the above example, and may further include additional elements or may exclude some of the elements shown in the figure for efficiency of signaling. Some elements may be signaled through signaling information (e.g., APS, attribute header, etc.) other than the SPS or through an attribute data unit.

FIG. 19 shows an example of a syntax structure of signaling information related to a predictive tree.

FIG. 19 shows an example of a syntax structure of a GPS. In the example, signaling information related to a predictive tree is included in a sequence level GPS. The syntax of the GPS includes the following elements.

gps_geom_parameter_set_id: Indicates an identifier for the GPS for reference by other syntax elements. The value of gps_geom_parameter_set_id shall be in the range of 0 to 15, inclusive.

gps_seq_parameter_set_id: Specifies sps_seq_parameter_set_id for the active SPS. The value of gps_seq_parameter_set_id shall be in the range of 0 to 15, inclusive.

The syntax of the GPS further includes signaling information related to the predictive tree described with reference to FIG. 18. Details of the signaling information related to the predictive tree is the same as those described with reference to FIG. 18, and thus a description thereof will be omitted. The GPS syntax according to the embodiments is not limited to the above example, and may further include additional elements or may exclude some of the elements shown in the figure for efficiency of signaling. Some elements may be signaled through signaling information (e.g., APS, attribute header, etc.) other than the GPS or through an attribute data unit.

FIG. 20 shows an example of a syntax structure of signaling information related to a predictive tree.

FIG. 20 shows an example of a syntax structure of a tile parameter set (TPS). In the example, signaling information related to a predictive tree is included in a tile level TPS. The syntax of the TPS includes the following elements.

num_tiles: Indicates the number of tiles signaled for the bitstream. When this information is not present, num_tiles is 0.

The following is information signaled for each tile (i) of tiles as many as the number indicated by num_tiles.

tile_bounding_box_offset_x[i]: Indicates the x-axis offset of the i-th tile in the Cartesian coordinates. When this information is not present, the offset of the 0th tile, tile_bounding_box_offset_x[0], is inferred to be sps_bounding_box_offset_x, which indicates the x-axis offset of the sequence level bounding box.

tile_bounding_box_offset_y[i]: Indicates the y-axis offset of the i-th tile in the Cartesian coordinates. When this information is not present, the offset of the 0th tile, tile_bounding_box_offset_y[0], is inferred to be sps_bounding_box_offset_y, which indicates the y-axis offset of the sequence level bounding box.

The syntax of the tile parameter set further includes signaling information related to the predictive tree described with reference to FIG. 18. Details of the signaling information related to the predictive tree is the same as those described with reference to FIG. 18, and thus a description thereof will be omitted. However, the signaling information has a difference in that the signaling information related to the predictive tree included in the syntax of the tile parameter set is signaled for each tile. Accordingly, the point cloud data reception device (e.g., the point cloud data reception device described with reference to FIGS. 1, 13, 14, and 16) may perform predictive tree decoding for each tile based on the signaling information related to the predictive tree.

The syntax of the TPS according to the embodiments is not limited to the above example, and may further include additional elements or may exclude some of the elements shown in the figure for efficiency of signaling. Some elements may be signaled through signaling information (e.g., APS, attribute header, etc.) other than the TPS or through an attribute data unit.

FIG. 21 shows an example of a syntax structure of signaling information related to a predictive tree.

FIG. 21 shows an example of a syntax structure of a geometry slice header. In the example, signaling information related to a predictive tree is included in a geometry slice header of a slice level. The syntax of the geometry slice header includes the following elements.

gsh_geometry_parameter_set_id: Specifies the value of gps_geom_parameter_set_id of the active GPS.

gsh_tile_id: Specifies the value of the tile_id that is referred to by the geometry slice header. The value of gsh_tile_id shall be in the range of 0 to any value.

gsh_slice_id: Identifies the slice header for reference in other syntaxes. The value of gsh_slice_id falls within the range from 0 to any value.

The syntax of the geometry slice header further includes signaling information related to the predictive tree described with reference to FIG. 18. Details of the signaling information related to the predictive tree is the same as those described with reference to FIG. 18, and thus a description thereof will be omitted. However, the signaling information has a difference in that the signaling information related to the predictive tree included in the syntax of the geometry slice header is signaled for each slice. Accordingly, the point cloud data reception device (e.g., the point cloud data reception device described with reference to FIGS. 1, 13, 14, and 16) may perform predictive tree decoding for each slice based on the signaling information related to the predictive tree.

The syntax of the geometry slice header according to the embodiments is not limited to the above example, and may further include additional elements or may exclude some of the elements shown in the figure for efficiency of signaling. Some elements may be signaled through signaling information (e.g., attribute header, etc.) other than the geometry slice header or through an attribute data unit.

Figure 22:
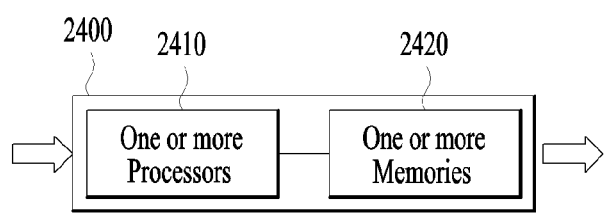
FIG. 22 is an exemplary block diagram of a point cloud data processing device according to embodiments.

FIG. 22 is an exemplary block diagram of a point cloud data processing device according to embodiments.

The point cloud data processing device 2400 shown in FIG. 22 is an example of the reception device 10004 described with reference to FIG. 1, the point cloud decoder described with reference to FIGS. 10 and 11, or the reception device described with reference to FIG. 13. The point cloud data processing device 2400 shown in FIG. 22 performs a decoding operation corresponding to the operation of the point cloud data processing device 1500 described with reference to FIG. 15. The point cloud data processing device 2400 according to the embodiments includes one or more processors 2410 and one or more memories 2420 electrically and communicatively coupled with the one or more processors. Although the one or more processors 2410 are represented as a single block in the figure for simplicity, they may be configured as one or more physically separated hardware processors, or may be configured as a combination of software/hardware or a single hardware processor. The one or more processors 2420 according to the embodiments may be electrically and communicatively coupled with each other. Although the one or more memories 2420 are represented as a single block in the figure for simplicity, they may be configured as one or more physically separated memories or as one memory. The one or more memories according to the embodiments may store one or more programs for processing point cloud data.

The one or more processors 2410 according to the embodiments receive the bitstream described with reference to FIGS. 1 to 21, and secure signaling information (SPS, GPS, APS, etc.) contained in the bitstream. In addition, the one or more processors 2410 perform geometry decoding for decoding a geometry (or a geometry bitstream), and decode an attribute (or an attribute bitstream) contained in the bitstream based on the decoded geometry. The geometry decoding according to the embodiments corresponds to the geometry encoding described with reference to FIGS. 1 to 23, and the attribute decoding according to the embodiments corresponds to the attribute encoding described with reference to FIGS. 1 to 23. The geometry decoding and attribute decoding according to embodiments may be performed in the unit of the entire sequence or per tile or slice according to a level at which the signaling information is signaled. Also, the geometry decoding and attribute decoding may be performed using a coding algorithm (e.g., the coding algorithm described with reference to FIGS. 15 and 16).

The one or more processors 2410 according to the embodiments may include processors that perform geometry decoding and attribute decoding, respectively.

The geometry decoding of the one or more processors 2410 according to the embodiments may include one or more of the operations of the arithmetic decoder 11000, the octree synthesizer 11001, the surface approximation synthesizer 11002, the geometry reconstructor 11003, and the coordinate inverse transformer 11004 described with reference to FIG. 11. The attribute decoding of the one or more processors 2410 according to the embodiments may include one or more of the operations of the arithmetic decoder 11005, the inverse quantizer 11006, the RAHT transformer 11007, the LOD generator 11008, the inverse lifter 11009, and/or the color inverse transformer 11010 described with reference to FIG. 11, and one or more of the operations of the color transform processor 12008, the attribute transform processor 12009, the prediction/lifting/RAHT transform processor 12010, and the arithmetic coder 12011. In addition, the one or more processors 2410 according to the embodiments may perform predictive tree decoding based on the above-described predictive tree generation pseudo code.

At least one of the elements of the point cloud encoder described with reference to FIGS. 10 to 11 and the elements of the reception device described with reference to FIG. 13 may correspond to the process of at least one of the one or more processors 1510. Although not shown in the figure, the decoded geometry and decoded attributes are transferred to the renderer. The content of the point cloud data may be displayed on the display based on the rendered geometry and attributes.

Figure 23:
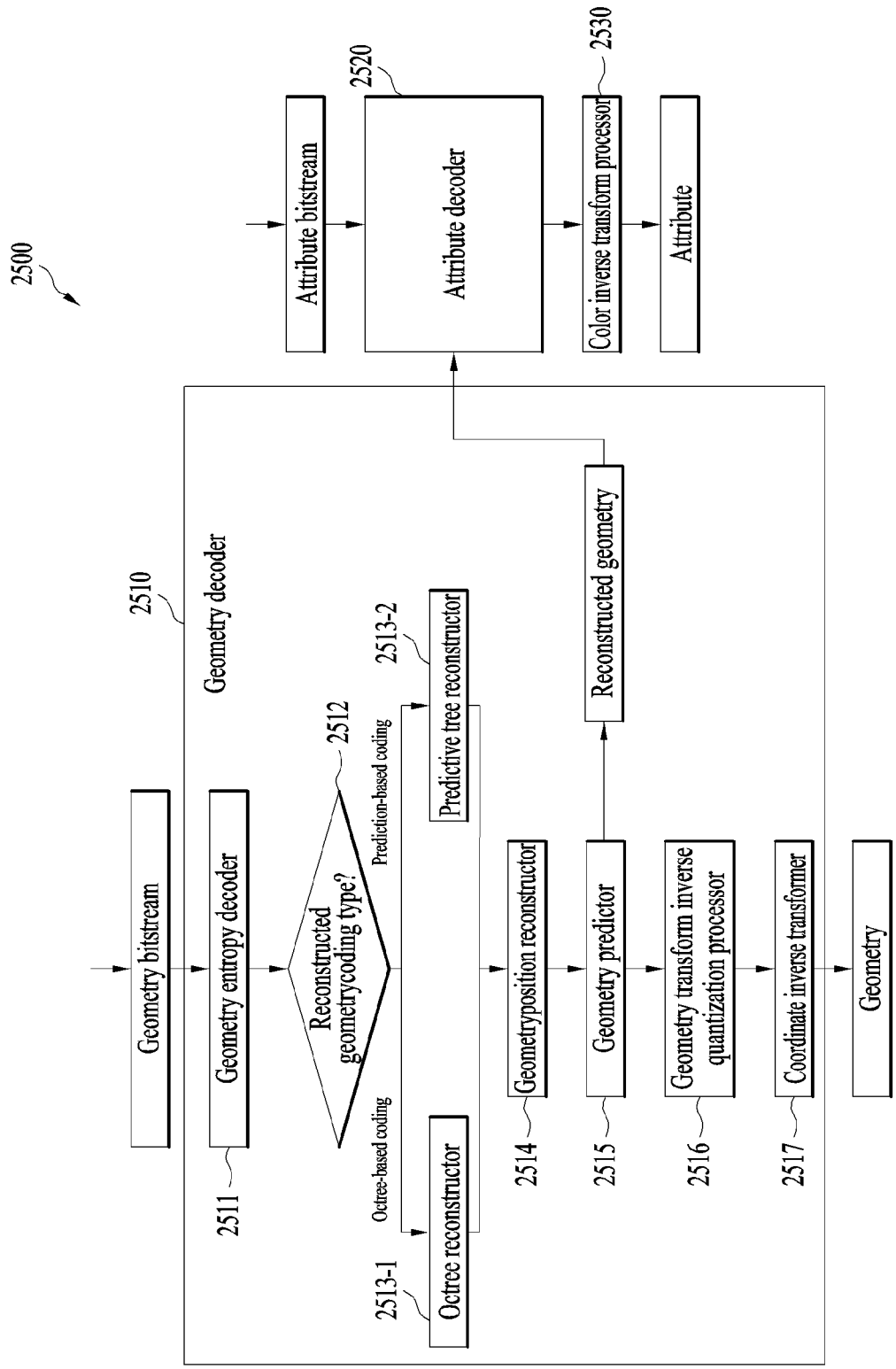
FIG. 23 is a flowchart illustrating a point cloud data processing method according to embodiments.

FIG. 23 is a flowchart illustrating a point cloud data processing method according to embodiments.

The flowchart 2500 of FIG. 23 illustrates an example of a data processing method for the point cloud data processing device 2400 described with reference to FIG. 22. For simplicity, the flowchart 2500 is expressed based on the elements of the point cloud data processing device described with reference to FIG. 22. At least one element disclosed in FIG. 23 may correspond to the elements of the at least one processor described with reference to FIG. 22, the reception device 10004 described with reference to FIG. 1, the point cloud decoder described with reference to FIGS. 10 and 11, and the reception device described with reference to FIG. 13, and the names or functions thereof are not limited to this example.

The point cloud data processing device may process a geometry bitstream and an attribute bitstream, respectively. As described with reference to FIGS. 1 to 22, the geometry bitstream and the attribute bitstream may be multiplexed into one bitstream and transmitted/received. The point cloud data processing device (e.g., the reception processor 130010) may secure the geometry bitstream and the attribute bitstream from the received bitstream. The point cloud data processing device (e.g., the metadata parser 13006) according to the embodiments may secure the signaling information contained in the bitstream described with reference to FIGS. 17 to 21. The point cloud data processing device may process the geometry bitstream and the attribute bitstream simultaneously, or may process the geometry bitstream first, and then process the attribute bitstream based on the reconstructed geometry.

The geometry decoder 2510 of the point cloud data processing device may decode the geometry bitstream. The geometry decoder 2510 performs the geometry decoding described with reference to FIGS. 1 to 22. The geometry decoder 2510 and the elements of the geometry decoder 2510 may include a processor, a hardware encoder, software, or a combination of hardware and software as described with reference to FIG. 22.

The geometry entropy decoder (e.g., the arithmetic decoder 11000 of FIG. 11, the arithmetic decoder 13002 of FIG. 13) included in the geometry decoder 2510 may decode the geometry in the geometry bitstream based on arithmetic coding (2511). The operation of the geometry entropy decoder is the same as that described with reference to FIGS. 11 and 13, and thus a detailed description thereof will be omitted.

The geometry decoder 2510 according to the embodiments may check the geometry coding type applied to the geometry based on the signaling information described with reference to FIGS. 19 to 22 (2512). As described above, the geometry coding includes octree geometry coding, predictive tree coding, and trisoup geometry encoding. When the geometry coding type indicates octree geometry coding, the octree reconstructor performs octree-based coding (decoding), which is a decoding operation of the octree geometry coding (2513-1). When the geometry coding type indicates predictive tree coding, the predictive tree reconstructor generates the predictive tree described with reference to FIGS. 15 to 22 and performs predictive tree coding (decoding) (2513-2). The predictive tree reconstructor according to the embodiments performs predictive tree decoding (or predictive tree geometry decoding), which is a decoding operation of predictive tree coding. The predictive tree reconstructor according to the embodiments may perform the same operation as the operation of the predictive tree generator described with reference to FIG. 16. For example, the predictive tree reconstructor may sort the points using the coding algorithm described with reference to FIGS. 15 and 16 based on the signaling information related to the predictive tree described with reference to FIGS. 17 to 21, and generate a predictive tree according to a predictive tree generation method to perform predictive tree decoding. The signaling information related to the predictive tree and the predictive tree generation are the same as those described with reference to FIGS. 15 to 22, and thus a description thereof will be omitted. Also, the name of the predictive tree decoding according to the embodiments is not limited to this example.

The geometry position reconstructor according to the embodiments (e.g., the geometry reconstructor 11003 described with reference to FIG. 11) reconstructs a geometry position. The operation of the geometry position reconstruction is the same as that described with reference to FIGS. 10, 11 and 13, and thus a detailed description thereof will be omitted.

The geometry predictor outputs a reconstructed geometry by performing predictive coding on the geometry whose position is reconstructed (2515). The reconstructed geometry is transmitted to the attribute decoder 2520.

The geometry transform inverse quantization processor (e.g., the inverse quantization processor 13005 described with reference to FIG. 13) inversely quantizes the geometry. The operation of the geometry transform inverse quantization processor is the same as that described with reference to FIGS. 10, 11 and 13, and thus a detailed description thereof will be omitted.

The coordinate inverse transformer (e.g., the coordinate inverse transformer 11004 described with reference to FIG. 11) may acquire positions of points by transforming the coordinates of the geometry. The operation of the coordinate inverse transformer is the same as that described with reference to FIGS. 10, 11 and 13, and thus a detailed description thereof will be omitted.

The attribute decoder 2520 performs the attribute decoding described with reference to FIGS. 1 to 22. The attribute decoder 2520 may include a processor, a hardware encoder, software, or a combination of hardware and software as described with reference to FIG. 22. The attribute decoding is the same as that described with reference to FIGS. 1, 10, 11, and 13, and thus a detailed description thereof will be omitted. The color inverse transform processor (e.g., the color inverse transformer 11010 of FIG. 11) performs inverse transform coding to inversely transform color values (or textures) included in decoded attributes. The color inverse transform processor may be included in the attribute decoder 2520. The operation of the color inverse conversion processor is the same as that described with reference to FIGS. 10, 11 and 13, and thus a detailed description thereof will be omitted.

The order of operations/processes of the point cloud data processing device illustrated in the flowchart 2500 of FIG. 23 may be changed, and is not limited to this example.

Figure 24:
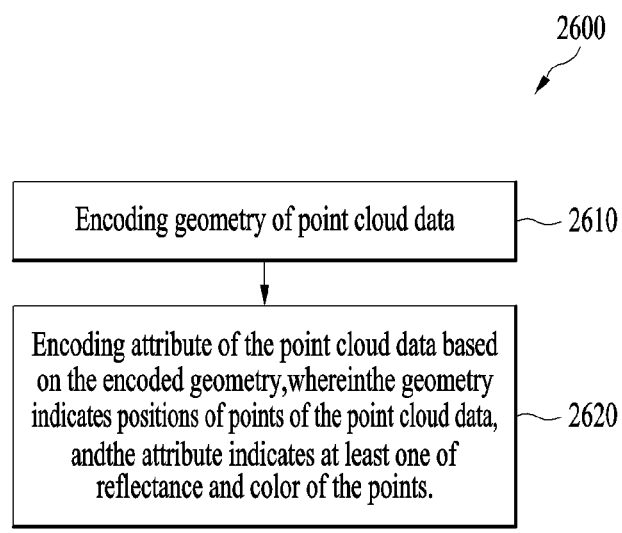
FIG. 24 illustrates a point cloud data processing method according to embodiments.

FIG. 24 illustrates a point cloud data processing method according to embodiments.

The flowchart 2600 of FIG. 24 illustrates a processing method for a device for processing point cloud data (e.g., the point cloud data processing device 1500 of FIG. 15).

The device according to the embodiments includes one or more processors for processing point cloud data and one or more memories coupled with the one or more processors.

The device (or one or more processors) according to the embodiments may encode the geometry of the point cloud data (2610). The geometry represents the positions of points in the point cloud data. The encoding of the geometry according to the embodiments may be performed based on any one of an octree, a predictive tree, and a trisoup structure. The method of encoding the geometry according to the embodiments is the same as the geometry encoding described with reference to FIGS. 1 to 23, and thus a detailed description thereof will be omitted.

The device according to the embodiments may encode an attribute of the point cloud data based on the decoded geometry (2620). The attribute indicates at least one of reflectance and color of the points. The method of encoding the attribute according to the embodiments is the same as the attribute encoding described with reference to FIGS. 1 to 23, and thus a detailed description thereof will be omitted.

The encoded geometry and encoded attributes are output as a bitstream (e.g., the bitstream described with reference to FIG. 19). The bitstream according to the embodiments contains the signaling information described with reference to FIGS. 17 to 21.

The signaling information according to the embodiments may include information related to a predictive tree. The information related to the predictive tree may include type information (e.g., pred_geom_tree_sorting_type described with reference to FIGS. 18 to 21) indicating the sorting type of points and information indicating a method for generating a predictive tree (e.g., pred_geom_tree_building_method described with reference to FIGS. 18 to 21). The information indicating the method for generating the predictive tree corresponds to at least one of a method of generating the predictive tree based on a sorting order of the points, a method of generating the predictive tree based on an influence based on a distance between the points, a method of generating the predictive tree based on an influence based on attribute similarity between the points, a method of generating the predictive tree based on an N-th position in the sorting order of the points, or a method of generating the predictive tree based on a center position in the sorting order of the points, as described with reference to FIG. 16. The information related to the predictive tree according to the embodiments may be signaled at at least one of a sequence level, a tile level, and a slice level of the bitstream as described with reference to FIGS. 18 to 21, according to the level at which the predictive tree generation-based geometry coding (or the predictive tree geometry coding) described with reference to FIG. 16 is applied. Details of the bitstream and the signaling information according to the embodiments are the same as those described with reference to FIGS. 17 to 21, and thus a description thereof will be omitted.

The order of the operations of the point cloud data processing method illustrated in the flowchart 2600 of FIG. 24 may be changed and is not limited to this example.

Figure 25:
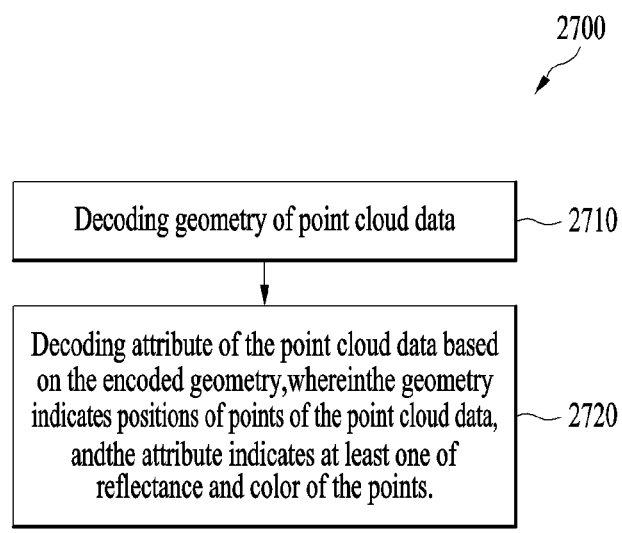
FIG. 25 illustrates a point cloud data processing method according to embodiments.

FIG. 25 illustrates a point cloud data processing method according to embodiments.

The flowchart 2700 of FIG. 25 shows a processing method for a device for processes point cloud data (e.g., the point cloud data processing device 2200 of FIG. 15).

The device according to embodiments includes one or more processors for processing point cloud data and one or more memories coupled with the one or more processors.

The device according to the embodiments may decode the geometry of the point cloud data (2710). The geometry represents the positions of points in the point cloud data. The decoding of the geometry according to the embodiments may be performed based on any one of an octree, a predictive tree, and a trisoup structure. The method of decoding the geometry according to the embodiments is the same as the geometry decoding described with reference to FIGS. 1 to 23, and thus a detailed description thereof will be omitted.

The device according to the embodiments decodes an attribute of the point cloud data based on the decoded geometry (2720). The attribute indicates at least one of reflectance and color of the points. The method of decoding the attribute according to the embodiments is the same as the attribute decoding described with reference to FIGS. 1 to 23, and thus a detailed description thereof will be omitted.

The point cloud data according to the embodiments is received in the form of a bitstream described with reference to FIG. 17, and the bitstream contains signaling information. The information related to the predictive tree according to the embodiments may include type information (e.g., pred_geom_tree_sorting_type described with reference to FIGS. 18 to 21) indicating the sorting type of points and information indicating a method for generating a predictive tree (e.g., pred_geom_tree_building_method described with reference to FIGS. 18 to 21). The information indicating the method for generating the predictive tree corresponds to at least one of a method of generating the predictive tree based on a sorting order of the points, a method of generating the predictive tree based on an influence based on a distance between the points, a method of generating the predictive tree based on an influence based on attribute similarity between the points, a method of generating the predictive tree based on an N-th position in the sorting order of the points, or a method of generating the predictive tree based on a center position in the sorting order of the points, as described with reference to FIG. 16. The information related to the predictive tree according to the embodiments may be signaled at at least one of a sequence level, a tile level, and a slice level of the bitstream as described with reference to FIGS. 18 to 21, according to the level at which the predictive tree generation-based geometry coding (or the predictive tree geometry coding) described with reference to FIG. 16 is applied. Details of the bitstream and the signaling information according to the embodiments are the same as those described with reference to FIGS. 17 to 21, and thus a description thereof will be omitted. The flow of the point cloud data processing method shown in the flowchart 2700 of FIG. 25 may be changed, and is not limited to this example.

The components of the point cloud data processing devices according to the embodiments described with reference to FIGS. 1 to 25 may be implemented as hardware, software, firmware, or a combination thereof including one or more processors coupled with a memory. The components of the devices according to the embodiments may be implemented as a single chip, for example, a single hardware circuit. Alternatively, the components of the point cloud data processing devices according to the embodiments may be implemented as separate chips. In addition, at least one of the components of the point cloud data processing devices according to the embodiments may include one or more processors capable of executing one or more programs, wherein the one or more programs may include are instructions that execute or are configured to execute one or more of the operations/methods of the point cloud data processing devices described with reference to FIGS. 1 to 25.

Although embodiments have been described with reference to each of the accompanying drawings for simplicity, it is possible to design new embodiments by merging the embodiments illustrated in the accompanying drawings. If a recording medium readable by a computer, in which programs for executing the embodiments mentioned in the foregoing description are recorded, is designed by those skilled in the art, it may also fall within the scope of the appended claims and their equivalents. The devices and methods may not be limited by the configurations and methods of the embodiments described above. The embodiments described above may be configured by being selectively combined with one another entirely or in part to enable various modifications. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Descriptions of methods and devices may be applied so as to complement each other. For example, the point cloud data transmission method according to the embodiments may be carried out by the point cloud data transmission device or components included in the point cloud data transmission device according to the embodiments. Also, the point cloud data reception method according to the embodiments may be carried out by the point cloud data reception device or components included in the point cloud data reception device according to the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this document, the term "/"and"," should be interpreted as indicating "and/or." For instance, the expression "A/B" may mean "A and/or B." Further, "A, B" may mean "A and/or B." Further, "A/B/C" may mean "at least one of A, B, and/or C." "A, B, C" may also mean "at least one of A, B, and/or C." Further, in the document, the term "or" should be interpreted as "and/or." For instance, the expression "A or B" may mean 1) only A, 2) only B, and/or 3) both A and B. In other words, the term "or" in this document should be interpreted as "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signal unless context clearly dictates otherwise.

The terminology used to describe the embodiments is used for the purpose of describing particular embodiments only and is not intended to be limiting of the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

As described above, related contents have been described in the best mode for carrying out the embodiments.

It will be apparent to those skilled in the art that various changes or modifications can be made to the embodiments within the scope of the embodiments. Thus, it is intended that the embodiments cover the modifications and variations of the present disclosure provided they come within the scope of the appended claims and their equivalents.

What is claimed is:

1. A device for encoding point cloud data, the device comprising:
   an encoder configured to encode a geometry data based on a predictive tree,
   wherein the predictive tree is generated by sorting points of the geometry based on at least one of an azimuth or a Morton order for the points,
   encode an attribute of the point cloud data based on the geometry; and
   a transmitter configured to transmit a bitstream including the geometry and the attribute,
   wherein the bitstream further includes method information for representing a method related to the predictive tree, and direction information for representing a direction related to prediction.

2. The device of claim 1,
   wherein the bitstream includes type information indicating a sorting type of the points,
   wherein the information indicating the method for generating the predictive tree corresponds to at least one of a method of generating the predictive tree based on a sorting order of the points, a method of generating the predictive tree based on an influence based on a distance between the points, a method of generating the predictive tree based on an influence based on attribute similarity between the points, a method of generating the predictive tree based on an N-th position in the sorting order of the points, or a method of generating the predictive tree based on a center position in the sorting order of the points.

3. The device of claim 2, wherein the information related to the predictive tree is signaled at least one of a sequence level, a tile level, or a slice level of the bitstream.

4. A method of encoding point cloud data by a device, the method comprising:
   encoding a geometry of the point cloud data based on a predictive tree,
   wherein the predictive tree is generated by sorting points of the geometry based on at least one of an azimuth or a Morton order for the points;
   encoding an attribute of the point cloud data based on the geometry; and
   transmitting a bitstream including the geometry and the attribute,
   wherein the bitstream further includes method information for representing a method related to the predictive tree, and direction information for representing a direction related to prediction.

5. The method of claim 4,
   wherein the signaling information the bitstream includes type information indicating a sorting type of the points,
   wherein the information indicating the method for generating the predictive tree corresponds to at least one of a method of generating the predictive tree based on a sorting order of the points, a method of generating the predictive tree based on an influence based on a distance between the points, a method of generating the predictive tree based on an influence based on attribute similarity between the points, a method of generating the predictive tree based on an N-th position in the sorting order of the points, or a method of generating the predictive tree based on a center position in the sorting order of the points.

6. The method of claim 5, wherein the information related to the predictive tree is signaled at least one of a sequence level, a tile level, or a slice level of the bitstream.

7. A device for decoding point cloud data, the device comprising:
   a receiver configured to receive a bitstream including a geometry and an attribute; and
   a decoder configured to decode the geometry based on a predictive tree,
   wherein the predictive tree is generated by sorting points of the geometry based on at least one of an azimuth or a Morton order for the points; and
   decode an attribute of the point cloud data based on the geometry,
   wherein the bitstream further includes method information for representing a method related to the predictive tree, and direction information for representing a direction related to prediction.

8. The device of claim 7,
   wherein the signaling information includes type information indicating a sorting type of the points,
   wherein the information indicating the method for generating the predictive tree corresponds to at least one of a method of generating the predictive tree based on a sorting order of the points, a method of generating the predictive tree based on an influence based on a distance between the points, a method of generating the predictive tree based on an influence based on attribute similarity between the points, a method of generating the predictive tree based on an N-th position in the sorting order of the points, or a method of generating the predictive tree based on a center position in the sorting order of the points.

9. The device of claim 8, wherein the information related to the predictive tree is signaled at least one of a sequence level, a tile level, or a slice level of the bitstream.

10. A method of decoding point cloud data by a device, the method comprising:
    receiving a bitstream including a geometry and an attribute;
    decoding a geometry of the point cloud data based on a predictive tree,
    wherein the predictive tree is generated by sorting points of the geometry based on at least one of an azimuth or a Morton order for the points; and
    decoding an attribute of the point cloud data based on the geometry,
    wherein the bitstream further includes method information for representing a method related to the predictive tree, and direction information for representing a direction related to prediction.

11. The method of claim 10,
    wherein the signaling information includes: type information indicating a sorting type of the points,
    wherein the information indicating the method for generating the predictive tree corresponds to at least one of a method of generating the predictive tree based on a sorting order of the points, a method of generating the predictive tree based on an influence based on a distance between the points, a method of generating the predictive tree based on an influence based on attribute similarity between the points, a method of generating the predictive tree based on an N-th position in the sorting order of the points, or a method of generating the predictive tree based on a center position in the sorting order of the points.

12. The method of claim 11, wherein the information related to the predictive tree is signaled at least one of a sequence level, a tile level, or a slice level of the bitstream.

* * * * *